United States Patent [19]

Schwartz

[11] Patent Number: 4,682,248

[45] Date of Patent: Jul. 21, 1987

[54] AUDIO AND VIDEO DIGITAL RECORDING AND PLAYBACK SYSTEM

[75] Inventor: David M. Schwartz, Englewood, Colo.

[73] Assignee: CompuSonics Video Corporation, Palo Alto, Calif.

[21] Appl. No.: 776,809

[22] Filed: Sep. 17, 1985

Related U.S. Application Data

[63] Continuation-in-part of Ser. No. 651,111, Sep. 17, 1984, which is a continuation-in-part of Ser. No. 486,561, Apr. 19, 1983, Pat. No. 4,472,747.

[51] Int. Cl.⁴ .................... G11B 5/00; G10L 5/02
[52] U.S. Cl. ............................ 360/32; 381/51
[58] Field of Search .............. 381/51, 41; 360/32; 358/22; 340/703, 717, 747

[56]  References Cited

U.S. PATENT DOCUMENTS

| 3,102,165 | 8/1963 | Clapper | 381/51 |
|---|---|---|---|
| 3,236,947 | 2/1966 | Clapper | 179/1 |
| 3,435,134 | 3/1969 | Richards | 178/6 |
| 3,685,031 | 8/1972 | Cook | 340/174.1 |
| 3,723,879 | 3/1973 | Kaul et al. | 325/38 |
| 3,725,592 | 4/1973 | Tanaka | 179/15.55 |
| 3,745,264 | 7/1973 | Emerson et al. | 179/100.2 |
| 3,786,201 | 1/1974 | Myers et al. | 179/100.2 |
| 3,855,617 | 12/1974 | Jakowski et al. | 360/32 |
| 4,015,286 | 3/1977 | Russell | 358/13 |
| 4,075,423 | 2/1978 | Martin et al. | 381/50 |
| 4,150,397 | 4/1979 | Russell | 358/127 |
| 4,211,997 | 7/1980 | Rudnick et al. | 371/38 |
| 4,214,125 | 7/1980 | Mozer | 381/51 |
| 4,225,885 | 9/1980 | Lux et al. | 340/146.3 |
| 4,270,150 | 5/1981 | Diermann et al. | 360/10 |
| 4,281,355 | 7/1981 | Wada et al. | 360/32 |
| 4,302,776 | 11/1981 | Taylor et al. | 360/39 |
| 4,335,393 | 6/1982 | Pearson | 358/4 |
| 4,345,314 | 8/1982 | Melamud | 364/515 |
| 4,365,304 | 12/1982 | Ruhman et al. | 364/515 |
| 4,368,988 | 1/1983 | Tahara et al. | 360/32 |
| 4,375,650 | 3/1983 | Tiemann | 358/133 |
| 4,387,406 | 6/1983 | Ott | 358/310 |
| 4,389,537 | 6/1983 | Tsunoda et al. | 381/51 |
| 4,389,681 | 6/1983 | Tanaka et al. | 360/27 |
| 4,392,159 | 7/1983 | Lemoine et al. | 358/319 |
| 4,410,917 | 10/1983 | Newdoll et al. | 360/15 |
| 4,411,015 | 10/1983 | Scherl et al. | 382/51 |
| 4,417,276 | 11/1983 | Bennett et al. | 358/160 |
| 4,417,283 | 11/1983 | Hoshimi et al. | 358/310 |
| 4,429,334 | 1/1984 | Hashimoto et al. | 358/310 |
| 4,432,019 | 2/1984 | Maier | 358/260 |
| 4,441,201 | 4/1984 | Henderson et al. | 381/51 |
| 4,455,635 | 6/1984 | Dieterich | 369/59 |
| 4,458,110 | 7/1984 | Mozer | 381/51 |
| 4,493,106 | 1/1985 | Farhangi et al. | 382/41 |
| 4,504,972 | 3/1985 | Scherl et al. | 382/51 |
| 4,516,246 | 5/1985 | Kenemuth | 375/37 |
| 4,519,027 | 5/1985 | Vogelsberg | 381/51 |
| 4,520,401 | 5/1985 | Takahashi et al. | 358/310 |
| 4,528,585 | 7/1985 | Bolger | 358/22 |
| 4,549,201 | 10/1985 | Tanaka et al. | 358/13 |

Primary Examiner—Vincent P. Canney
Attorney, Agent, or Firm—Jerry W. Berkstresser

[57]  ABSTRACT

A microcomputer system for converting an analog signal, such as an audio or video signal representative of sound or video into a digital form for storing in digital form in a highly condensed code and for reconstructing the analog signal from the coded digital form. The system includes reductive analytic means where the original digital data stream is converted to a sequential series of spectrograms, signal amplitude histrograms and waveform code tables. Approximately 100 times less storage space than previously required for the storage of digitized signals is thereby obtained. Additive synthesis logic interprets the stored codes and recreates an output digital data stream for digital to analog conversion that is nearly identical to the original analog signal.

3 Claims, 18 Drawing Figures

NOTE: PARITY BITS NOT SHOWN

FIG. 7 ANALOG SIGNAL REPRESENTING SHELF CONTENTS

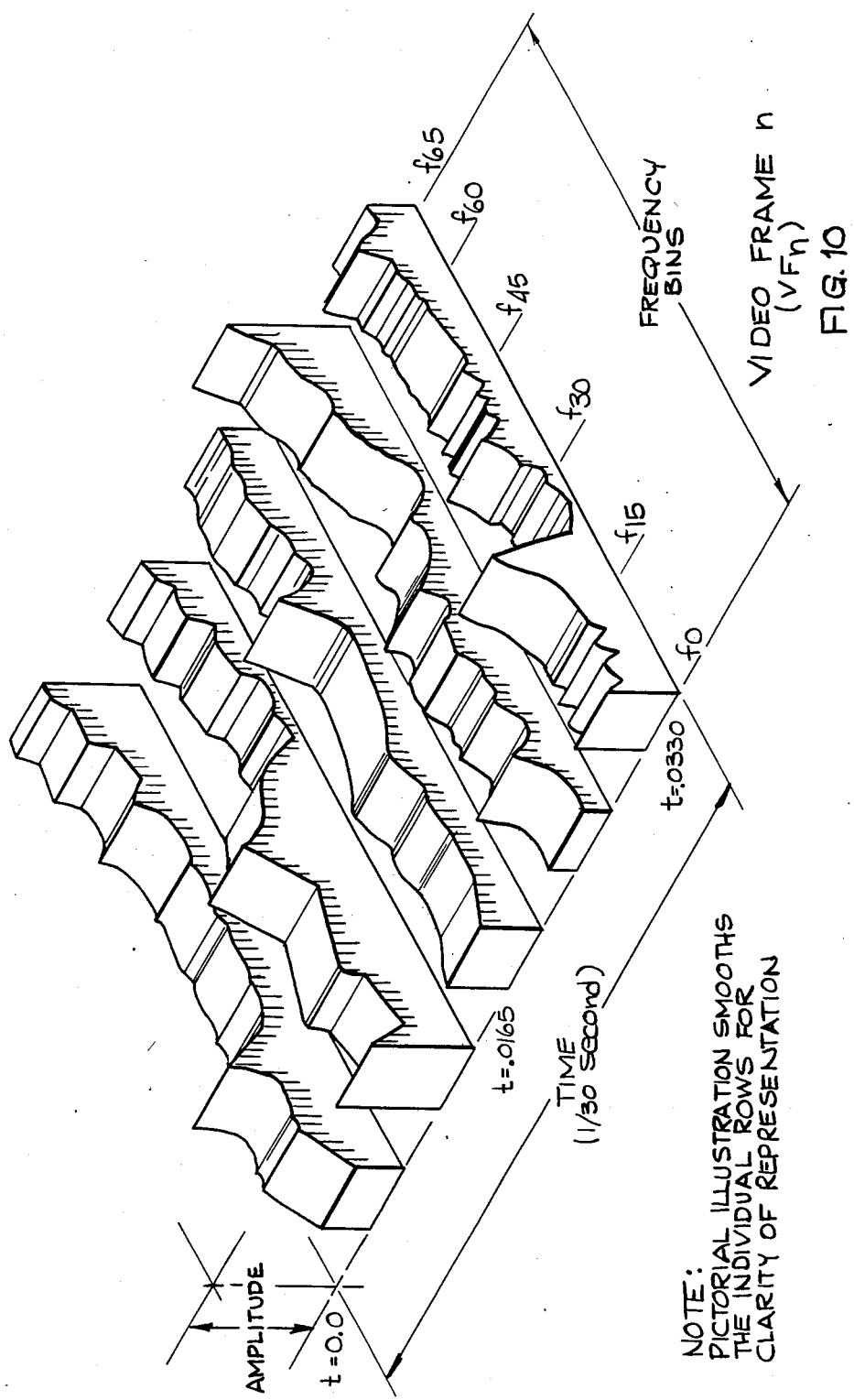

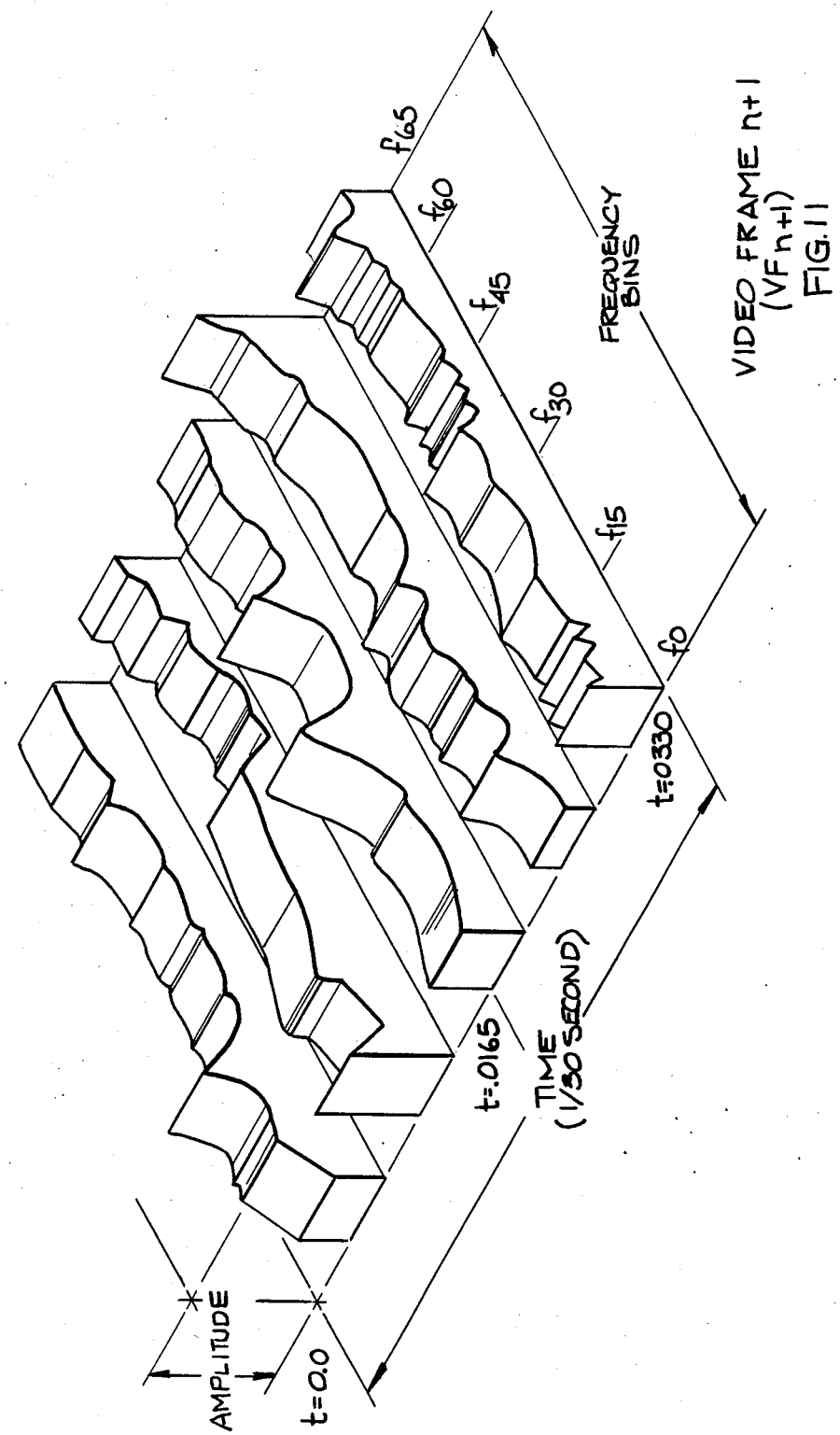

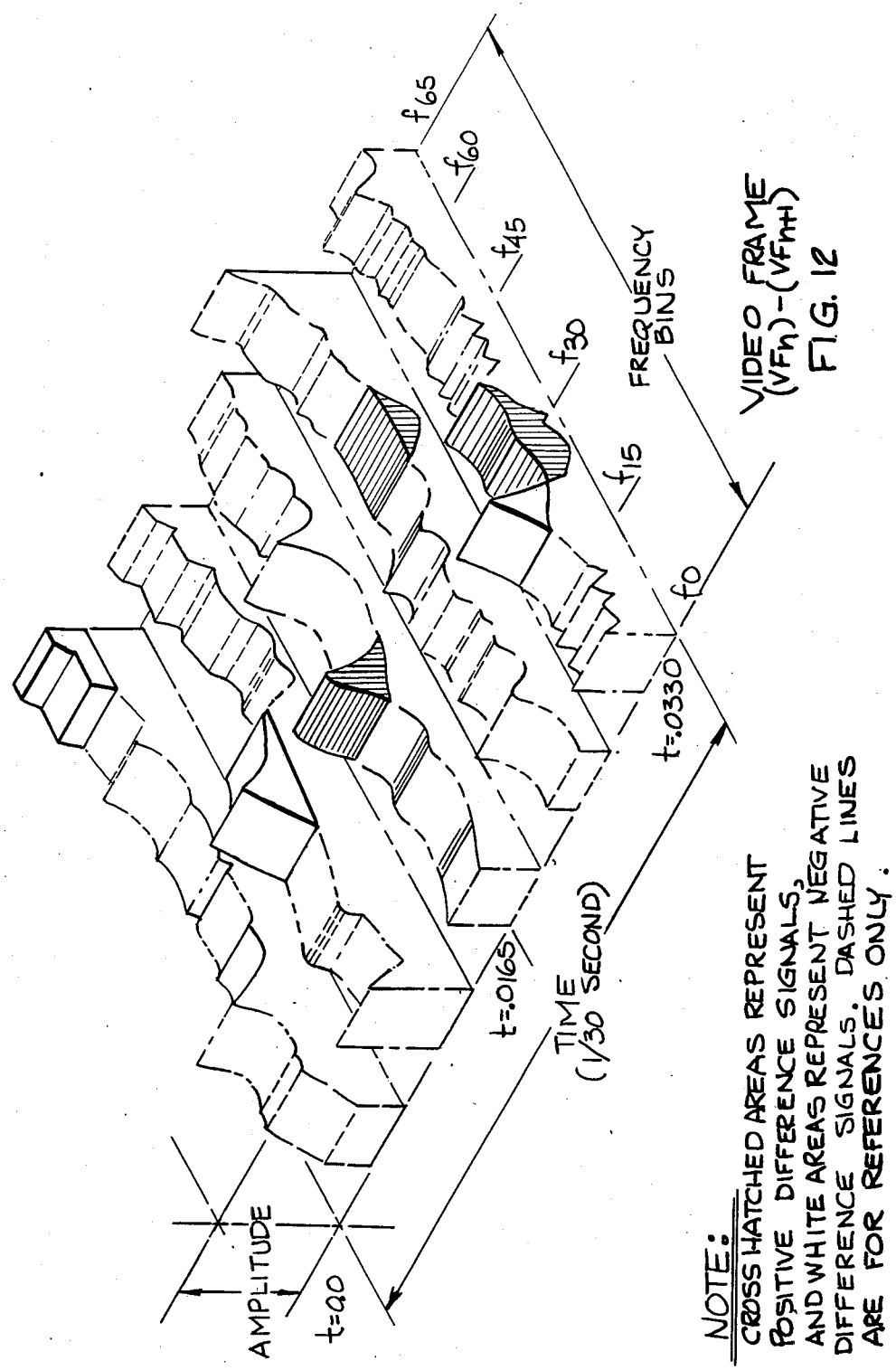

REPRESENTATIONAL OF TRISTMULUS VALUES AT ONE PIXEL

AUDIO AND VIDEO DIGITAL RECORDING AND PLAYBACK SYSTEM

BACKGROUND OF THE INVENTION

This application is a continuation-in-part of U.S. patent application Ser. No. 651,111 filed Sept. 17, 1984 which is a continuation in part of U.S. patent application Ser. No. 486,561, filed Apr. 19, 1983, now U.S. Pat. No. 4,472,747, directed to Audio Digital Recording and Playback System of David M. Schwartz.

Conventional recording of sound and playback is performed by electronic systems of the analog type. The sound waves from a source being recorded are converted to electrical signals on a one to one basis; the acoustic sound waves have their analogy in the electrical current generated by the microphone or pre-amplifier circuit such as used in a receiver, turntable or magnetic tape source. On playback the electrical signal is amplified and used to drive loudspeakers which convert the electrical signal to sound waves by the mechanical motion of an electromagnet and speaker cone.

Conventional video recorders store the electrical waveforms, generated by the video camera, representing the visual image. The most common memory devices used to store the waveforms are magnetic tape or disk. These devices store an analogy to the electrical waveforms in the form of magnetic gradients in the medium of magnetic particles. The waveforms may be a composite of the color signal or discrete red, green, and blue signals, depending on the system. Due to the analog nature of the system, the noise level is high and the results of surface defects are readily seen in the image when it is played back.

Similarly, the output of conventional recording and playback systems consists of electrical signals in the form of signal waveforms either cut into a vinyl medium or imposed on magnetic particles on tape. On playback, the signal waveforms are converted into sound waves as described above. The accuracy of the reproduced sound wave is directly dependent on the quality of the metal or plastic disk or of the tape itself. Both the production of disk copies and tapes and their means of playback tend to degrade the quality of the reproduced analog signal. Noise, in the form of contamination, wear and the inherent background output of the medium itself is therefore unavoidably present in the recording and playback systems utilizing conventional analog to analog recording and playback technology. Recent developments in audio-digital sound recording and playback systems represent efforts to reduce or eliminate this noise problem. Exemplary of such developments are the kinds of systems and equipment disclosed in the following patents: U.S. Pat. Nos. Meyers et al, 3,786,201 issued Jan. 15, 1974; Borne et al, 4,075,665, issued Feb. 21, 1978; Yamamoto, 4,141,039, issued Feb. 20, 1979; Stockham, Jr. et al, 4,328,580 issued May 4, 1982; Tsuchiya et al, 4,348,699 issued Sept. 7, 1982; and Baldwin, U.S. Pat. No. 4,352,129 issued Sept. 28, 1982, the disclosures of which are specifically incorporated herein by reference. These systems are characterized generally as taking advantage of the high speed operation of digital electronic computers. The signal waveform, representative of sound in such digital sound recording and playback systems, is frequently sampled to produce a serial stream of data that is translated into a binary code that assigns a numerical value for each sample. This can be visualized as slicing up a continuous curve into a large number of very short step-like segments. The process is reversed on playback as each numerical value of each segment is converted into an output voltage. When this process is done rapidly enough, the fact that the signal wave form representative of a sound wave has been "chopped up" and re-assembled cannot be detected by the human ear. When sound is recorded in digitized binary code in this manner, the sound, such as music, is only a series of numbers represented by magnetic tracks on a recording medium which, when read by the appropriate electronic means, are either "on" or "off" with no intermediate values. Such binary signals are virtually immune to distortion, error, and degradation with time. All sources of noise normally associated with analog devices are eliminated that is, there is no tape hiss, no tracking errors, no surface effects. Signal to noise ratios are limited only by the digital to analog conversion circuit itself and the power amplifiers, rather than the sensitivity of the mechanical or magnetic analog to analog conversion circuitry.

These systems do, however, have several drawbacks. A representative system currently in use for recording master tapes in the record industry has excellent audio qualities as a result of a high speed sampling rate of 50 KHz and good digital binary code resolution in the form of a 16 bit word for each sample. The problem with this system is that every sample must be preserved in mass storage for playback. The storage system thus must hold on the order of 4,320,000,000 bits of information for a 45 minute record. Storage systems of this capacity are large, expensive, and generally not suitable for a consumer product.

Attempts to resolve the storage capacity problem have taken the approach of reducing the resolution of each sample (fewer bits per "word") while at the same time reducing the sampling rate to 12 khz). Such reductions have reduced the data storage requirement by as much as a factor of 4. The resulting fidelity of the output, however, is often below that acceptable for high fidelity sound recordings of music.

Another approach much favored by telephone companies, employs the foregoing reduction of bits described above and in addition adds the restriction of input signal band width to that most used by talking voices (50 Hz to 3500 Hz). A total data reduction factor of about 12 is possible in this manner, again accompanied with a reduction in sound quality.

Recent attempts at a solution to the storage problem and the fidelity reduction problem utilizes ultra high density digital storage by laser recording technology. This has been partially successful in that adequate playing times have been achieved with the improved storage capacity. However, the manufacturing technology and equipment presently necessary to create a "laser-burned hole", "pit", or "black spot" in the storage medium restricts "laser disks" or "laser fiches" to the "playback only" mode with no potential for in-home recording or erasing and editing.

With respect to digital video recording, digital memory devices identical to those used in conventional computer systems have found use storing very high quality images. Small digital memories of 10 to 500 megabytes are frequently used as still frame stores for image processors that create special effects and enhancements. The digital memories tend to be small for cost reasons. Typically, the video images are recorded on magnetic tape as they are produced, in analog form, then small portions of the tape are digitized and transferred to the digital image memory for manipulation. When the image processing task is complete, the data in the digital memory is converted back into analog form and stored on magnetic tape.

The digital image storage and playback systems currently in use have two principal problems: cost and slow access speed. The high cost of digital memory for image storage is a result of the large quantities of data produced when analog video is digitized. The wide bandwidth of the video signal consumes memory at the rate of 80,000,000 binary numbers (bits) per second. Slow access to stored images is the result of the time consuming task of locating and transferring the desired image from analog tape to the digital system, and then back again before the next segment can be processed.

Typical present day digital video recorders are composed of an imaging system such as a video camera, a digitizer, digital memory for frame buffering, and a winchester disk or optical disk data storage subsystem. These recorders are restricted to non real time operation due to the limited bandwidth of the data channel in and out of the storage subsystem. The fastest disk storage device will sustain an average data transfer rate of less than 10,000,000 bits per second. This is about one eighth the rate required to capture continuous moving images.

Solutions to the above problems have been limited by the negative complementary nature of the relationships between access time, digital memory size, and tape transport speed.

It is therefore an objective of the present invention to provide a system for high fidelity sound recording and playback that does not have the foregoing drawbacks and associated problems.

It is therefore an objective of the present invention to store high quality digital video and audio data in a readily accessible, durable, and inexpensive form, and to provide a system for video and audio playback of the stored data.

BRIEF DESCRIPTION OF THE INVENTION

The present invention, using high density recording on a low cost magnetic media, such as a magnetic tape or disc or magneto-optical discs, or optical discs in a system having a random access memory architecture and a unique bit rate reduction scheme for processing digital audio and video data, provides a digital audio, video recording and playback system.

SUMMARY OF THE INVENTION

The present invention is yet another approach to a solution to the storage and reproduction problems associated with digital audio recording and playback systems described herein and digital video recording and playback systems. Good audio fidelity can be achieved with limited computer storage capacity by the provision of unique electronic signal processing means which: (1) converts analog data to digital data stream samples; (2) selects portions of the samples to produce at least three data streams indicative of amplitude, frequency and waveform characteristics; (3) stores data samples indicative of waveform having a predetermined time duration, comparing each such sample of waveform data against predetermined waveform parameters to select and preserve only predetermined portions, said waveform data samples matching the preserved portions with pre-existing waveform and real time data and generating a resultant waveform data code from such comparison, and then comparing the selected data from the data streams which are indicative of frequency and amplitude with the waveform data code to produce another data code proportional to the frequency and amplitude of the original analog signal, sequentially recording the data stream indicative of amplitude, the data code indicative of frequency and amplitude, and the data code indicative of waveform, onto a recording media, for subsequent playback by the processing of the sequentially recorded data.

And if audio and video recording is desired, the following description will apply.

A micro computer recording system for recording analog audio and video signals in digital data form can comprise converting means for converting an analog audio signal into a multiplicity of digital data streams wherein at least one of the data streams is a relatively broadband reference signal representative of the amplitude of a preselected range of audio frequencies, and wherein another of the data streams is produced by filtering the analog audio signal to produce a data stream channel indicative of a plurality of discrete frequencies encompassed by the bandwidth represented by the first data stream; and wherein another of the digital data stream is a reference signal representative of the amplitude of the audio signal for each of plurality of discrete frequencies; sampling means for producing a sequential stream of samples in each of the digital data streams, selection means for selecting a predetermined portion of the digital data samples produced by the sampling means in each digital data stream; means for separately storing each of the selected data samples produced by the sampling means; means for comparing the reference data stream containing amplitude data with the reference data stream containing frequency data to produce frequency spectrogram data representative of the frequency and energy of the original audio signal; means for comparing the histogram data with selected waveform parameters and producing addressable data representative of the waveform of the original input data; means for sequentially assembling and storing the frequency spectrogram data and the amplitude reference data and the addressable waveform data for subsequent use; and converting means for converting an analog video signal into a multiplicity of digital data streams wherein the first of the digital data streams is a sequential time code representative of the beginning of each video frame, and wherein another of the digital data streams is produced by filtering the analog time domain signal to produce a data stream channel indicative of chrominance; and wherein another of the data streams is indicative of brightness; and wherein another of the digital data streams is indicative of pixel spatial relationships; and wherein another of the data streams is indicative of the temporal frame to frame relationships; and coding means for receiving each data stream individually, the coding means including means for mathematically transforming each digital data stream into modified data streams each capable of being subsequently analyzed by comparison of the chromanance, brightness and spatial factors present respectfully in the modified data streams, and means for selecting predetermined data bits from each of the modified data streams after comparison, in a sufficient amount to reconstruct each chromanance, brightness and spatial factors for video presentation, and means for storing the digital data bits for retrieval.

BRIEF DESCRIPTION OF THE DRAWINGS

FIG. 10 is a diagramatic representation of the transformed digital, video signal for one video frame ($VF_n$) displayed.

FIG. 11 is a diagramatic representation of the transformed digital video signal for the video frame ($VF_{n+1}$) following that depicted in FIG. 10.

FIG. 12 is a diagramatic representation of the difference between the frames depicted in FIGS. 10 and 11, or ($VF_n$)−($VF_{n+1}$).

DETAILED DESCRIPTION OF THE INVENTION

The present invention provides a system for converting input analog signals such as audio signals, and/or video signals into digital signals and subsequently coded into structured data sets for recording in condensed digital form; and, for reconstructing a digital data set similar to the original digital signal input prior to reconversion to the analog form of signal.

In its broadest sense, therefore, the recording of the audio signals into a digital form for subsequent playback is accomplished by the provision of a microcomputer recording system which comprises electronic components for converting an analog audio signal into at least three digital data streams, wherein the first of the digital data streams is a relatively broad band reference signal representative of the amplitude of a pre-selected range of audio frequencies, and the second of the data streams is produced by filtering the analog audio signal to produce at least one data stream channel indicative of a sampled bandwidth of frequencies narrower than the bandwidth represented by such first data stream, and a third reference data stream representative of the sampling frequency of the audio signal; sampling means for producing a sequential stream of data samples from each of the digital data streams, selection means for selecting a pre-determined portion of the digital data sample produced by the sampling means in each of the data streams; means for separately storing each of the selected digital data samples produced by the sampling means; means for comparing the reference signal data stream containing amplitude data with the second data stream containing frequency data to produce frequency spectrogram data representative of the frequency and amplitude of the original audio signal; means for transforming data samples of the third data stream channel selected from the narrower bandwidth into data representative of a time versus amplitude histogram for each bandwidth means for comparing the histogram data with selected waveform parameters and producing and storing addressable data representative of the waveform of the original audio input and means for sequentially assembling and storing the frequency spectrogram data and the amplitude reference data of the first data stream and the addressable waveform data for subsequent playback use.

Figure 1:
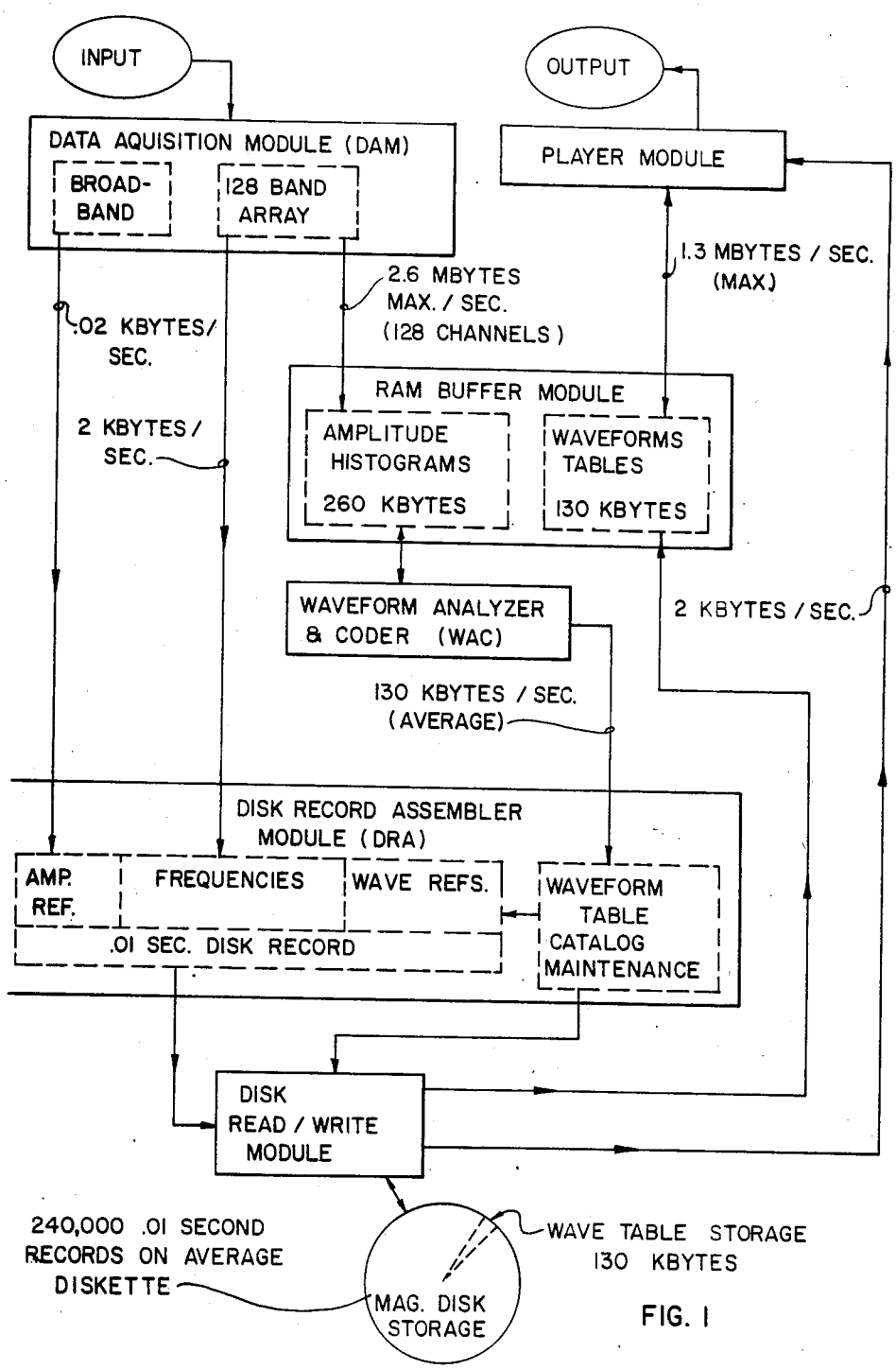
FIG. 1 is a schematic diagram of the digital recording and playback systems of the present invention.

In the preferred embodiment shown in FIG. 1, for digital audio recording and playback the input signal is conditioned and amplified in the first stage of the Data Acquisition Module (DAM). The DAM is a multichannel programmable microprocessor based device that utilizes standard integrated circuits to perform three functions:

1. To sample at the rate of 42 Khz, hold, digitize, and output the broadband (20 hz to 20 Khz) audio signal level (dc voltage) of amplitude every 0.01 second. Thus, 100 times every second a digital "word" composed of from 4 to 14 bits is created for assembly as part of a disk record file.

2. To sample, hold, digitize and output an audio frequency spectrogram every 0.01 second from a 128 segment array of logical bandpass filters which sample 128 channels and are arranged logarithmically over the overall band width used. The data set produced by this function may range from null (no signals on any channel) to (n) [(7 bit identifier+(7 bit scaler)+(2 bit pointer)] where (n) is the number of channels with signal content.

3. To act as a digital storage oscilloscope loader, assembling strings of digitized amplitude versus time data (histograms) corresponding to the array of bandpass filters selected in paragraph 2, above. This assembled data set is produced every 0.01 second and is the largest single data structure and contains time continuous listing for every active bandpass filter. The number of "words" in each string is a function of the filter center frequency and requires as many as 4,000 samples for a 20 Khz channel, or as few as five samples for a 20 hz channel. This data set is not sent to the file assembler as in paragraphs 1 and 2, above, but is loaded into a Random Access Memory (RAM) buffer where it is accessible by the Waveform Analyzer and Coder module.

The function of the Waveform Analyzer and Coder module (WAC FIG. 1) is to be a digital numeric processor array that is programmed to extract characteristic waveforms from the data set stored in the RAM by the DAM described above. The waveform data are reduced to tabular form in which one period of each waveform codified is assigned to one wave table which preferably is a digitized x-y coordinate system consisting of 1,024 bytes along the x axis and an 8 bit "word" in each byte location to scale the y axis in 256 increments; 127 above zero and 127 below. A set of wavetables is therefore generated for all active bandpass filter channels every 0.10 second. A range of 0 to 128 (P.M.S.) tables may be generated per cycle (0.01 second).

The WAC utilizes either one of several P.M.S. reductive analytic methods to find waveforms. The first being the Fast Fourier Transform (FFT) and the second the Fast Delta Hadamard Transform (FDHT). The two methods may be briefly described as follows:

The FFT is based on the principal that almost any periodic function f(x) of period 2 of vibrations can be represented by a trigonometric series of sines and cosines. The full expression in general terms is:

$$f(x) = \frac{1}{2\pi} \int_{-\infty}^{\infty} \left[ \int_{-\infty}^{\infty} f(v)e^{iw(x-v)}dv \right] dw$$

The algorithm for executing this equation efficiently was first published by Rabiner & Gold, 1974 and Oppenheim and Schafer, 1975.

The FDHT is utilized for the analysis of spectral composition of a data set where the spectrum $\Psi$ is in the form:

$$\psi(f) = \sum_{i=0}^{n-1} i \int [F - (Fi + 1 + Fi)/z]$$

wher Fi is the frequency and $\Psi$ i is signal intensity. In the present application of this method the digital output of the logical filters from hereinbefore numbered paragraph 2, is summed at each filter and added to the next output until all frequencies have been sampled. At the last step the total output is:

$$\eta j = \sum_{i=0}^{n-1} si + j\psi i$$

Then an estimation of the spectrum $\Psi'$ can be found by matrix multiplication:

$$\psi' = \frac{1}{n} S^B \cdot \eta = \frac{1}{n} S^B \cdot S \cdot \psi = \psi$$

The algorithm for implementing the FDHT was published in 1983 by E. E. Fenimore at Los Alamos National Laboratory. B-splines computational algorithms may also be employed to extract characteristic waveforms.

Ten times every second the latest produced set of waveform tables are sent to the Disk Record Assembler (DRA FIG. 1).

The Disk Record Assembler (DRA) is a program module that receives as input the waveform table references (addresses) from the WAC every 0.10 seconds and paragraph 2 (above) frequency spectrogram data sets every 0.01 seconds directly from the Data Acquisition Module (DAM) as well as the digital word representing the total broadband signal strength. The waveform tables are kept in a local memory buffer in the DRA so that they may be revised or discarded every 0.10 second cycle by a subroutine which for convenience will be called Waveform Catalog Maintenance. Disk records (FIG. 4) for storage are variable in length but always follow this format: the first 14 bits are the field length statement, the next 7 bits are the frequency filter or channel identifier followed by a 2 bit pointer (flag) and its 7 bit scaler, 7 bit waveform table identifier, 7 bit simultaneous waveform table identifier (repeat if necessary), 2 bit flag (signals next filter identifier), and so forth to the last 14 bit word which is the broadband signal level. The data stream format is shown graphically in FIG. 4.

Once a record is prepared for storage it is held in a local memory buffer in the DRA for one cycle so it can be compared to the next sequential record. This allows the DRA to utilize "tokens"; specific reserved symbols to identify "repeats", "same excepts" and "nulls" in the current record being assembled to save storage space.

The Waveform Catalog Maintenance Subroutine is programmed to evaluate incoming updates of waveform tables against the waveform tables previously stored, and among themselves. Since there are only 128 channels available for storage of the amplitude histogram output of the DAM, the comparison of the waveform output of the WAC with the stored waveform data of the DRA determines redundancy and duplicates are discarded. The remaining incoming tables are possibly unique or simply improved versions of forms already stored. Waveforms that contain new features on existing tables are saved in place of their previous table resident. Unique forms are assigned new tables. When an overload occurs due to a "full house" and a unique waveform arrives, it is placed in a local buffer for one cycle to determine its repetitiveness. If indeed it does occur in the next 0.10 second cycle, space in the Waveform Catalog is made for it by discarding the waveform most similar to another in the Catalog. The algorithms used for these evaluations are based on standard statistical methods for measuring the fit of two curves to one another.

In the preferred embodiment of this invention the storage medium is a 5.25" magnetic disk commonly in use for digital magnetic storage and retrieval. These disks have a storage capacity of about 1 megabyte (1 million bytes or 8 million bits) and are anticipated to reach 10 megabytes in the near future. For purposes of illustration, a 5 megabyte disk will be assumed.

Assembled disk records from the DRA are the input for the Disk Read/Write module. In the "write" mode, records in the form of the data stream format previously described, will be written to disk storage as long as there is space available. Considering an average record to be 20 bytes of data, the disk will contain about 240,000 records, each representing 0.01 seconds of real time. In addition, the entire Waveform Catalog is written to disk after all space on the disk has been filled, except for the 130 Kilobytes required for the Waveform Catalog itself.

In the retrieve mode, or playback, the Disk Read/Write Module first reads the Waveform Catalog from the disk into RAM. The waveform tables are then accessed by the Player module when called within each disk record. Each 0.01 second disk record is read from the disk serially to preserve its relationship to the real time of the original audio source material.

The Player module utilized in the present invention will preferably contain digital oscillators to produce the output signal and "smoothing" filters to eliminate the "steps" inherent in digital representations of continuous analog functions. Additive synthesis is the principal upon which the Player module's logic is based. Briefly summarized, additive synthesis theory states that complex musical signals can be constructed by summing all of the voltage components of the signal of each frequency subset at each instant in time. Thus, if the data reduction process preserves all of the original information about voltage versus time in such a way that it can be recombined precisely and in phase in time the output signal will equal the original input signal in each specified frequency or "pitch". In the preferred embodiment of the invention these conditions of additive synthesis are preserved at a level of perceptual resolution so that what the human ear will hear is indistinguishable from the original for most source material. The Player module then directs the oscillators to output at the frequencies specified by the disk records utilizing the waveform reference data to set the timbre of each oscillator and the broadband amplitude reference data sets the voltage levels. Synchronized timing is built into the system by definition of the 0.01 second cycle time upon which the system is based.

Figure 5:
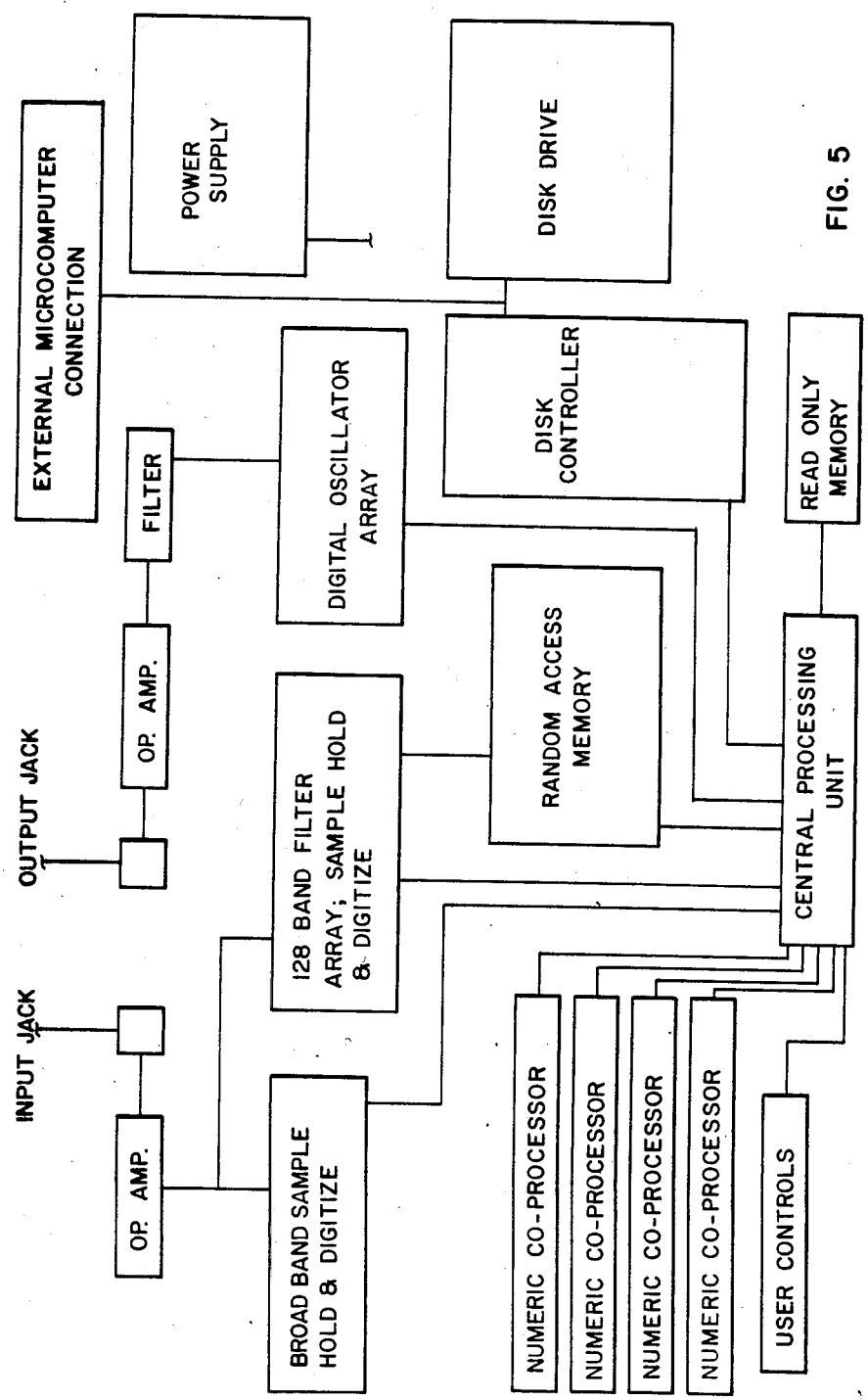
FIG. 5 is a diagrammatic representation of the layout of the electronic components used in the present invention.

A most preferred embodiment of the system will employ Very Large Scale Integrated Circuit (VLSIs) technology to reduce logical groupings of circuit to single semiconductor chips, as opposed to the schematic representation shown in FIG. 5 which utilizes many "off the shelf" Integrated Circuit components.

Figure 2:
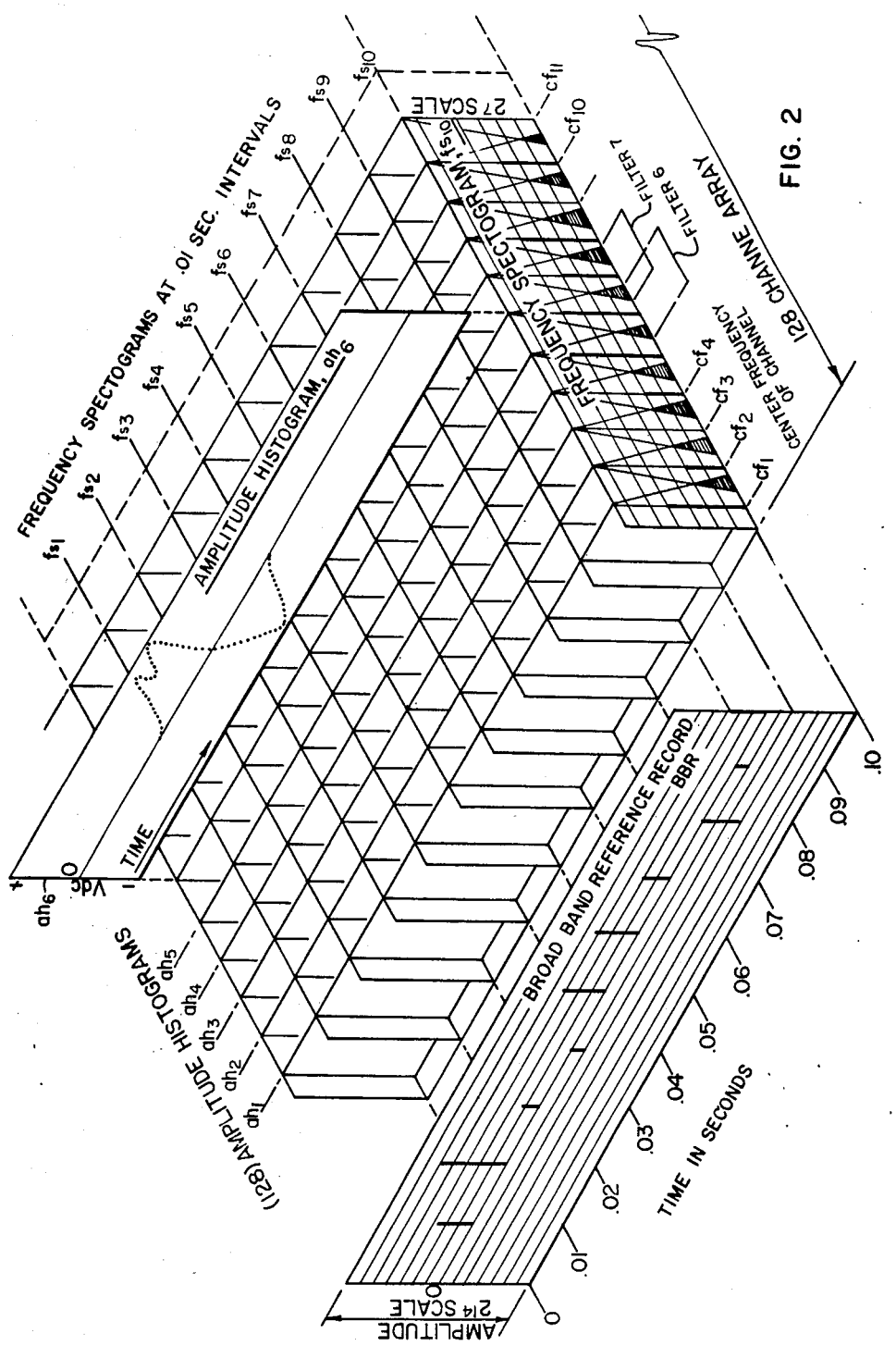
FIG. 2 is a pictorial representation of the analytical model of the function of the Data Acquisition module of FIG. 1.

Referring now to FIG. 2 the analytic model is graphically depicted. The model has three reference axis dimensions of measurement; time, amplitude (dc voltage), and frequency. The time axis is divided into 0.01 second increments. It is important to the understanding of the system of the present invention to realize that the 0.01 second interval corresponds to the rate at which incremental acoustic "snapshots" of the audio signal are recorded. This increment was chosen because it is short enough that the human ear physiologically hears a sequence of 0.01 second changes in total signal as a continuous integrated whole. The stream of acoustic "snapshots" is directly analogous to the stream of "frames" in a motion picture film.

The acoustic "snapshots" themselves contain, in binary form, the total broadband (20 to 20,000 hz) amplitude, a frequency spectrogram and waveform table references obtained from the DAM (FIG. 1). The illustration in FIG. 2 amplitude histograms, such as (ah$_6$) shows the waveforms contained in the so-called "amplitude histograms" which are the raw data sets used to write the waveform tables. This will be discussed in greater detail hereinafter. The total broadband amplitude record is the reading, every 0.01 seconds, of a continuous digital stream of 14 bit words "written" by the broadband sample, hold and digitizing circuit at the rate of 42,000 "words" per second. Viewed another way, this is like saying that only one word is saved for every 420 created. This series of amplitude readings is utilized from the RAM Buffer Module in the "playing" of the digital oscillators at the output end of the system. Every amplitude reading in every frequency channel is scaled to this reference level. Referring again to FIG. 2, (BBR) "broadband reference record" is a 2 dimensional data array in which the first term is the time value within the 0.10 second time frame incremented every 0.01 seconds (i.e. 0, 0.01, 0.02, seconds). The second term is the binary representation of the dc voltage level or amplitude at each time increment. The voltage level is recorded to the accuracy of a 14 bit word. This allows 16,384 discreet values for representation of the dc voltage range which may typically be from 0.05 volts to 5 volts. The absolute accuracy is thus 4.95 divided by 16,384 or ±0.0003 vdc.

It would be desirable to have this level of accuracy for the vdc measurement recorded in each bandpass filter channel. However, to achieve economy of storage space it is desirable to use as few bits as possible to represent the amplitude of the signal in each channel. To accomplish these contradictory goals the method of relative representation is adopted. Each frequency channel amplitude record is a bit word called a scaler value, that allows 128 values, which records each channel's signal as a proportion of the broadband value. Thus, a channel with a vdc that is 0.250 vdc, when the broadband value is 3.250, has a proportional value of 0.07692 with respect to the broadband signal. On a 7 bit scale this is a "3" out of 128. The second benefit of this approach is the increased speed of computation afforded by the comparative nature of modular arithmetic logic as opposed to the more time consuming logic for accumulating and encoding a 14 bit accurate "word" at each channel, thus utilizing a 7 bit word instead of a 14 bit word is a 50% savings in storage space.

Figure 3:
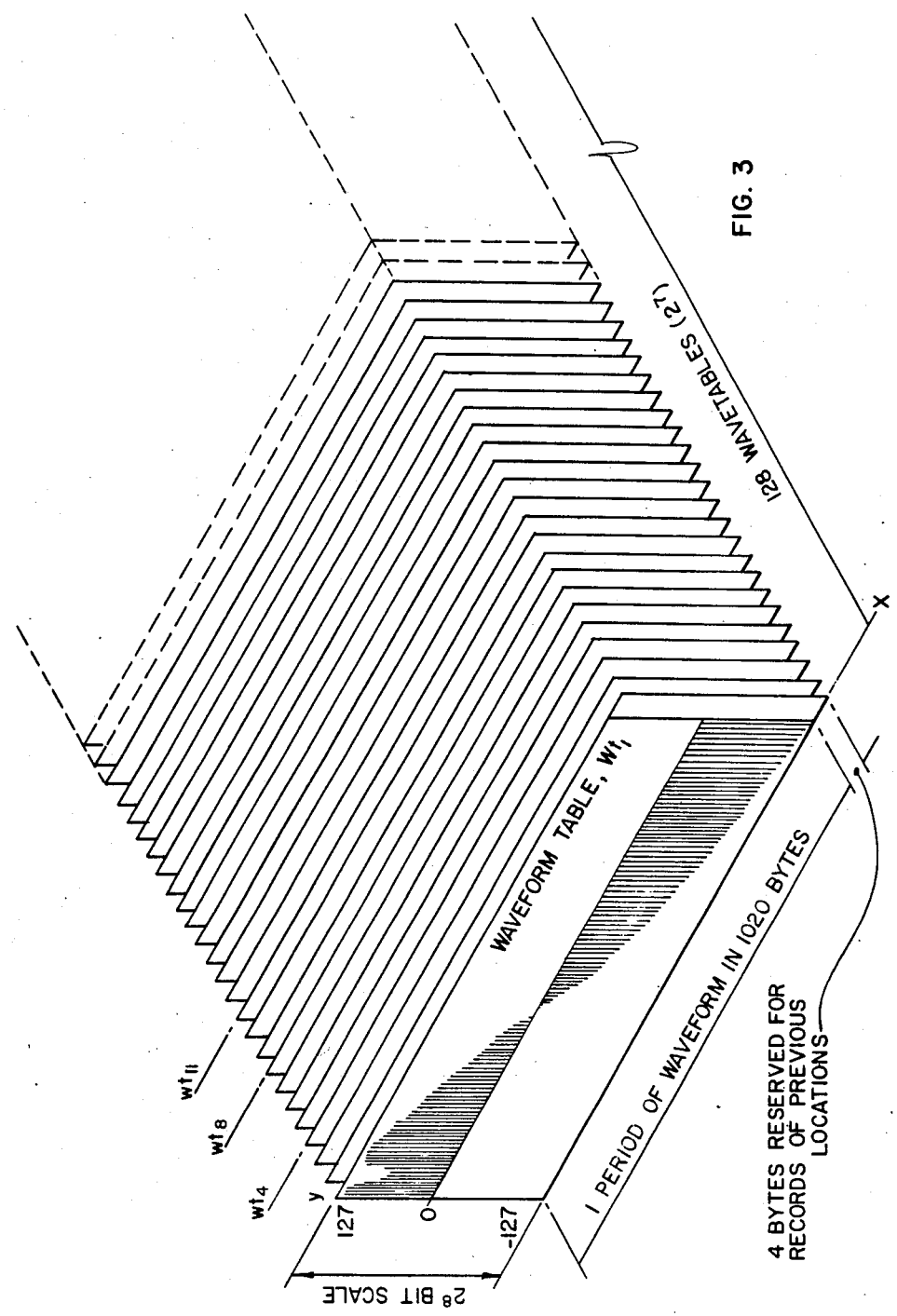
FIG. 3 contains a diagrammatic representation of the recorded waveform data.

Referring now to FIG. 3, the frequency spectrogram FIG. 10 is similar to the broadband amplitude record except that the amplitude of the voltage in each of 128 discreet narrow bandwidths is "saved" every 0.01 seconds. The 128 channels are sample, hold and digitizer circuits that are limited to the bandwidths they can "hear" by preselected digital bandpass filters. The distribution of the channels across the 20 to 20,000 hz audio range may be controlled by the user with equalizer type slide switches or may be automatically signal seeking. That is, the logic of the 128 channel array responds to the amplitude of the voltage in each of 128 discret narrow bandwidths and "self-centers" around "live" bandwidths. This principal is the same as used in signal seeking radio receivers.

As representatively shown in FIG. 2, there can be overlaps between channels such as shown by the shaded triangular regions on the frequency spectrogram axis. A signal in the overlap region indicates to the system logic that the channel array is not "in tune" with the incoming digitized signal and can serve to set a flag value for correction that can be used by the automatic ranging circuit to "step over" to the next acoustic "snapshot" to get a centered channel reading.

The amplitude histograms, for example ah$_6$ in FIG. 2, are created whenever a channel is "live". These histograms are point by point amplitude versus time binary plots that are generated on a real time continuous basis. They are not 0.01 second "snapshots". The actual length in time required for plotting a histogram will vary with the audio frequency of the channel. It is generally conceded that the higher the frequency, the more data points will be required to "feed" the Waveform Analyzer and Coder. Of course, the upper limit in time for this process is 0.10 seconds or the synchronization of the entire system would be affected. The purpose of the amplitude histograms is to provide the "raw data" for the FFT or FDHT routines that operate the WAC. In order for the FFT to characterize a series of X-Y coordinates as a periodic curve function, at least 2 complete cycles of the periodic function must be collected. In many cases, due to electronic recording logic circuit delays often referred to as "settling time" disturbances, more than 2 cycles worth of data must be collected for analysis.

Referring now to FIG. 3, the Wave Table Catalog information is graphically represented in its preferred form for the system. As soon as the Waveform Analyzer and Coder (FIG. 1), has "found" a waveform in an amplitude histogram (FIG. 2 $ah_6$) the waveform data for one period of the waveform is plotted on an X-Y coordinate system as shown graphically in wave table $wt_1$, of FIG. 3. The amplitude of the wave is plotted in the y dimension with 1,020 8 bit binary words that allow a precision of 127 steps above and below the x axis. The x axis itself is an arbitrary division of the waveform's period into 1,020 increments. The wave table has four bytes reserved for information about the tables status within the catalog of 128 tables. This is necessary since references to wave tables positions are made in each 0.01 second acoustic "snapshot" that may be revised as the recording proceeds and more or better information becomes available. Preferably, all rewrites of wave table references are accomplished at the end of an entire recording session in one pass through the disk records.

Figure 4:
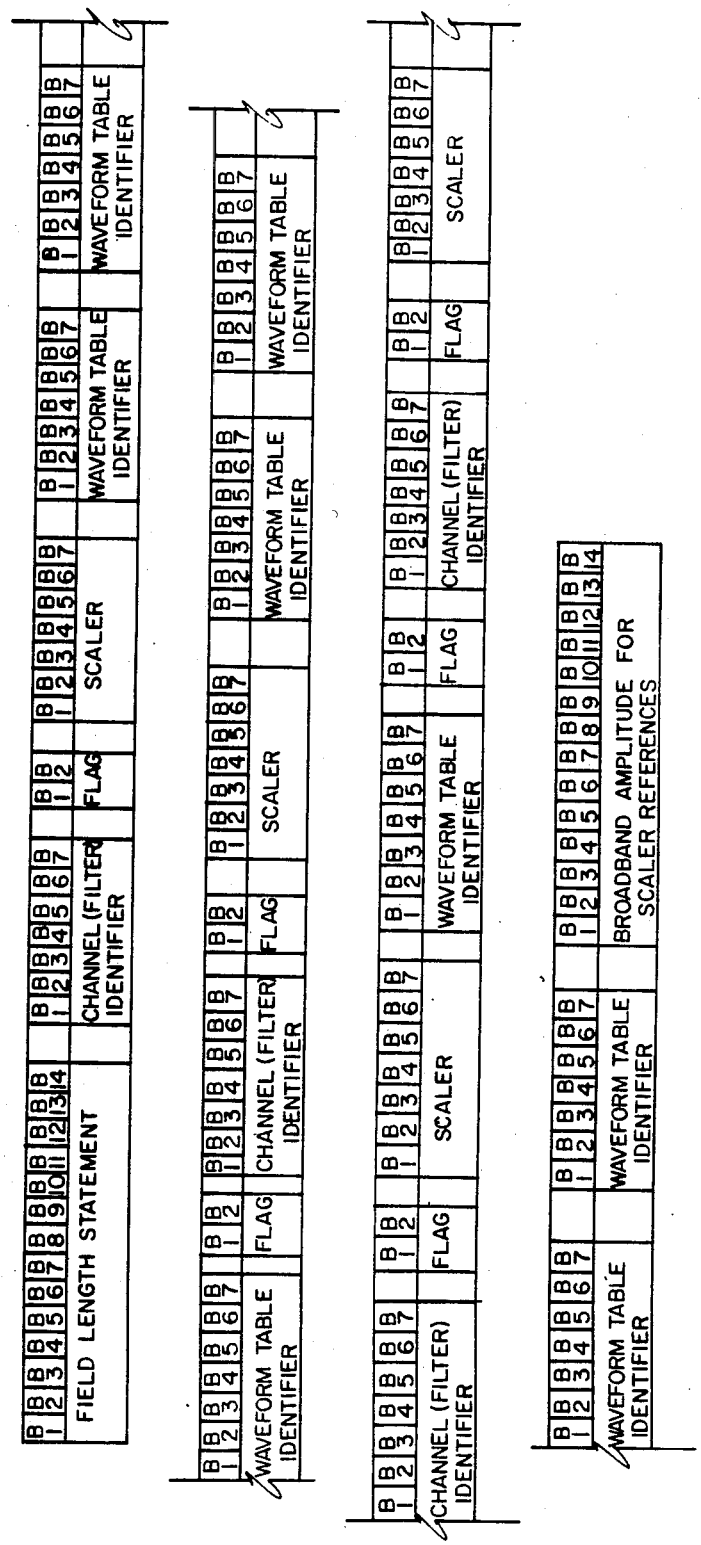
FIG. 4 is a pictorial representation of a single module of binary code as stored on disk, from which reproduction will be obtained according to the system of the present invention.

Referring to FIG. 4, the bit pattern for a typical acoustic "snapshot" is graphically depicted. An average diskette will contain 240,000 of these acoustic "snapshots". The first binary word is 14 bits long and is the binary number that is equal to the total number of bytes that follow in the acoustic "snapshot". This field length statement is necessary for control of the system data flow on playback. The "Player" module must be told by the controlling software how much data to buffer for 0.10 second of real time output. The following seven bit word tells the Player the first of the frequency identifiers contained in the acoustic "snapshot" followed by its two bit flag for frequency shifting, i.e. whether it is necessary or not, and in which direction. The third seven bit word is a binary number (from 1 to 128) that sets the relative amplitude (voltage level) for the previously stated frequency output. The fourth seven bit word is a binary number (from 1 to 128) that tells the Player where to find the waveform in the waveform table that is to be addressed with the frequency previously stated. The fifth and sixth seven bit words are also waveform table references to be applied to the first frequency statement.

In operation, the "Player" reads through the acoustic "snapshot" (disk record) and then proceeds to "load" a digital oscillator circuit with the values it has located by reference and those it has read directly from the acoustic "snapshot". For example, in the case of the record shown in FIG. 4, there are four frequencies called for. Each of these has a known number of oscillation frequencies, they are the same as the channel bands. These frequencies are assigned to specific digital oscillators. The amount of energy to be used to drive the oscillator is specified by the relationship of the scaler to the broadband reference signal specified by the 14 bit word at the end of the acoustic "snapshot". The waveform table references are linked to the frequency oscillators in the same order that they appear in the acoustic "snapshot". Each oscillator acquires the characteristic sound represented by the sum of the waveforms applied to it by the Player. The number of times a wave table is read per second by the Player for an oscillator is a function of the frequency of the oscillator; i.e. a 440 hz oscillator cycles (or reads) a wave table at the rate of 440 times a second.

Referring to FIG. 5, a typical schematic layout of the components and their interconnections are shown for a preferred embodiment of the present invention. Comparing the requirements shown in FIG. 1, for the various functions with the capabilities of various available electronic components, one can practice the present invention by selecting components having the requisite capabilities. For example, the broad band digitizer used in the data acquisition module (DAM) can be selected from commercially available high speed analog to digital encoders such as are available from Hewlett Packard, Datel, Inc., Intel or R.C. Electronics. The 128 channel array in the DAM can also be obtained from Hewlett Packard to convert analog to digital with specified pass characteristics for each channel. Currently, 16 channel components are available so that eight of such components would be required. As indicated in the Figures and the description contained herein, components such as the RAM should have up to 500k Byte capacity; Read Only Memory (ROM) 320k Bytes and the central processing unit (CPU) shown in FIG. 5 should preferably have 16 Byte 8 MHz capacity with multiple 80 Byte numeric data processor add on capacity. The disk drive unit shown may be replaced by any suitable means of digital read/write storage such as magnetic bubble memory packs, linear magnetic tape drives, laser based disks or fiches. The user control pad may offer tone, gain, range, track select and other additional features or it may be as simple as on/off, record/playback. Signal input and output is via conventional RCA type jacks.

The preferred embodiment of the present invention has been described with particular emphasis on the required functional characteristics of the components in the system logic that has been employed. It should be apparent that a wide variety of components may be applicable for use in the general system described to achieve the same or similar results. For example, different sampling rates, or the like may be employed advantageously with other components without departing from the spirit of the invention described. Indeed, the recording and playback functions can be integrated or separate and, indeed, it will be possible that the record format disclosed could be used with a computer or computer communications link, such as a modem to transmit the recorded data to a remote playback facility.

Additionally, digital information can be broadcast by an rf signal to a remote location for loading a local memory unit with the requisite wave table information, and then the digital data set information on the record can be transmitted for playback at the remote location. This can be done with relatively narrow bandwidth transmissions. The audio signal could then be reproduced by the playback unit at a remote location from the transmitted rf digital information. Again, this system has the advantage of achieving the high signal to noise ratio outputs which are inherent in digital communication systems.

The preferred embodiment of the present invention has been described in terms of the recording of sound and its playback. In addition to using the described system for audio playback, the output may be used for stimulating the auditory nerves in the manner achieved by hearing aids or artificial ears. No software changes would be necessary for achieving this output response.

The same concepts of the instant invention can apply equally well to medically related acoustic, EEG, or EKG analog signals. Here waveform tables established during a baseline medical exam using these non-invasive diagnostic techniques can be used to digitize and condense the analog signals during stress, post-operative or post-treatment diagnosis. The medical input could also be via an ultrasound probe and the instant invention could also store ultrasound images and analyze them for density and other sound wave detectable features.

The input of the present invention could also be a security listening device. The data streams of the instant invention would thus be indicative of security sound information. The random access memory would provide data for a comparison between potential break-in sound patterns and previously collected sound records. This would eliminate false trips of the alarm system. Memory disks could be changed to the use factor of the secured area. For example, a "week-end" disk would have an entirely different reference than a "night-shift" disk.

The input device could be a vibration detection device acoustically coupled to a piece of machinery such as an electric dynamo, mill, or press in a manufacturing plant, or any other device incorporating bearings which are heavily or cyclically loaded. The analog input contains numerous frequency, amplitude, and waveform information which is indicative of the condition of these bearings. This information can be analyzed by the microcomputer system of the instant invention and used to detect the otherwise subtle changes in these signal parameters to predict impending bearing failure, or the like.

Figure 6:
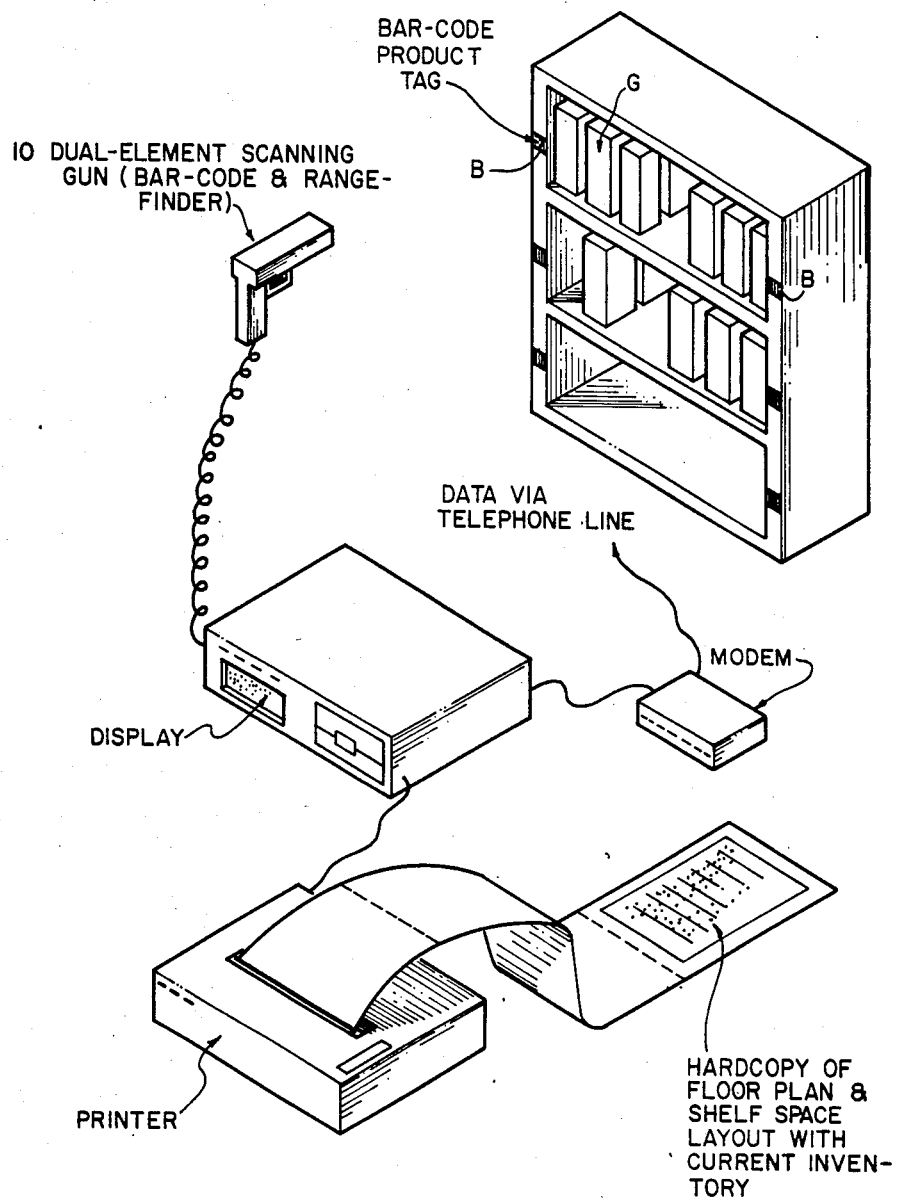
FIG. 6 is a pictorial representation of a warehouse inventory system.

FIG. 6 illustrates still another application of the microcomputer system disclosed supra. In this embodiment, an inventory detection and analysis system is disclosed. Here, the input to the data acquisition module of FIG. 1 is a hand held rangefinder device 10. Preferably, device 10 further includes a remote bar code reader of the holographic type. Device 10 is connected to a microcomputer system 12 (preferably of the type employing a battery power-pack for complete portability), incorporating the functional system of FIG. 1.

Figure 7:
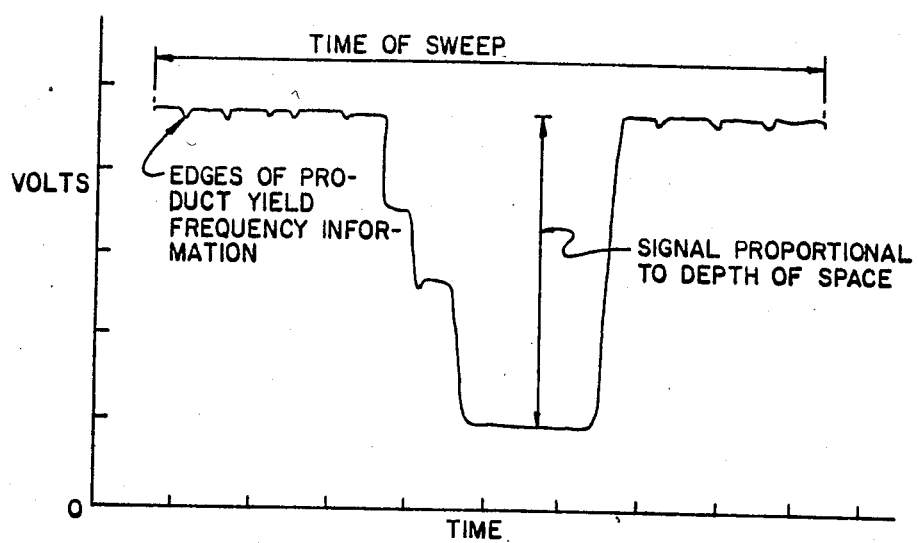
FIG. 7 represents an analog signal output of the apparatus of FIG. 6.
Figure 8:
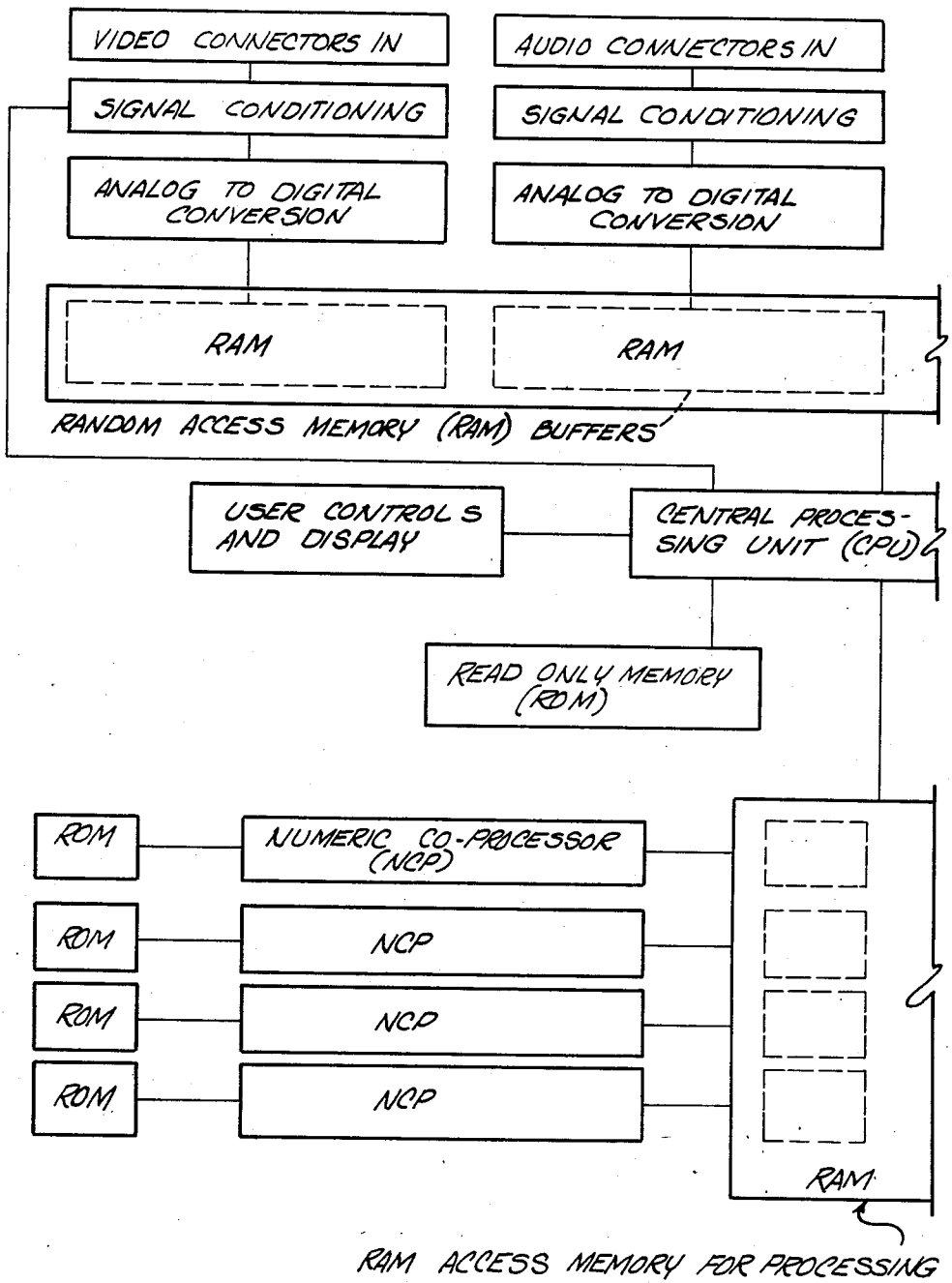
FIGS. 8 and 8a together are a schematic block diagram of the digital video recorder in the system of the present invention.
Figure 8A:
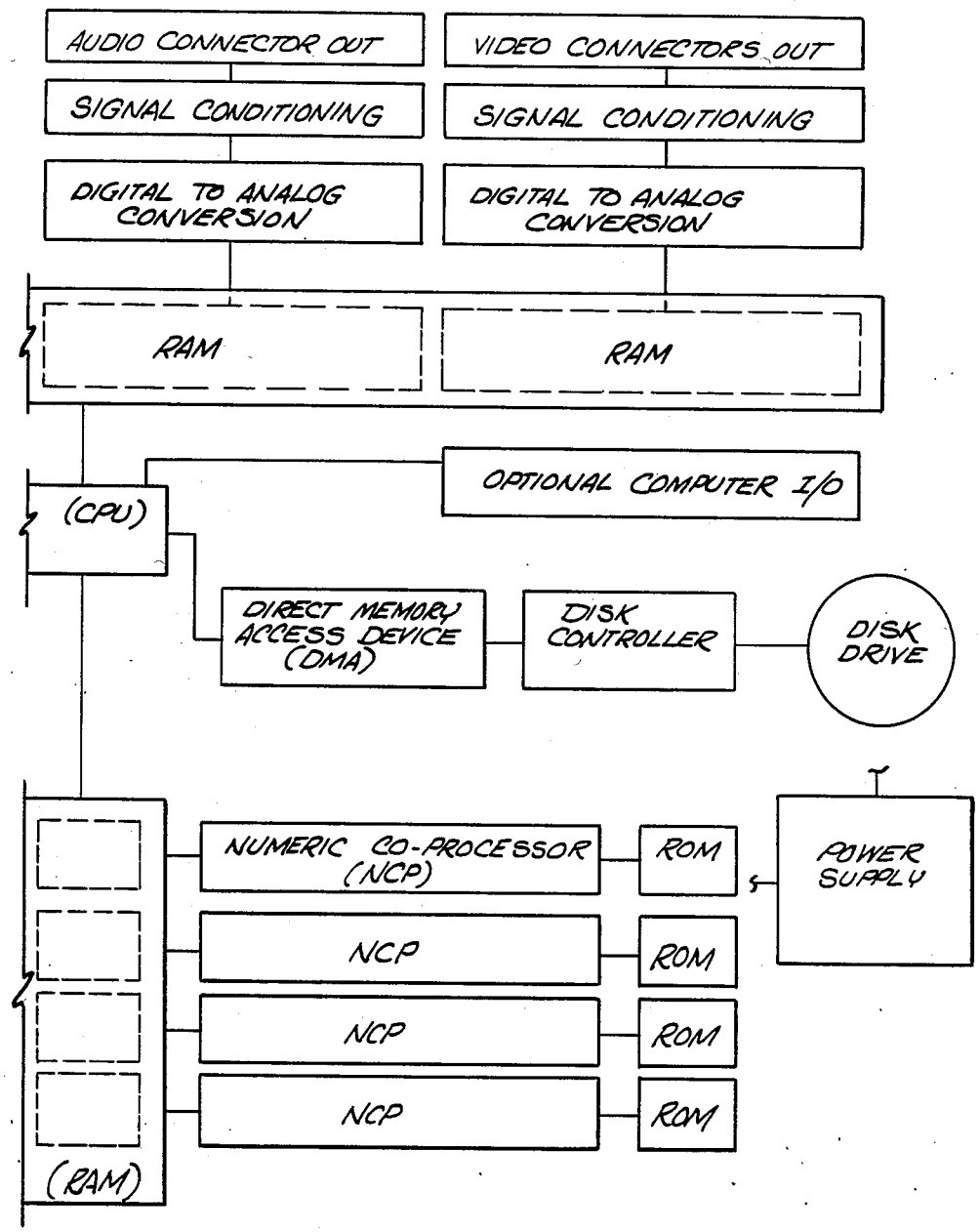
Figure 9:
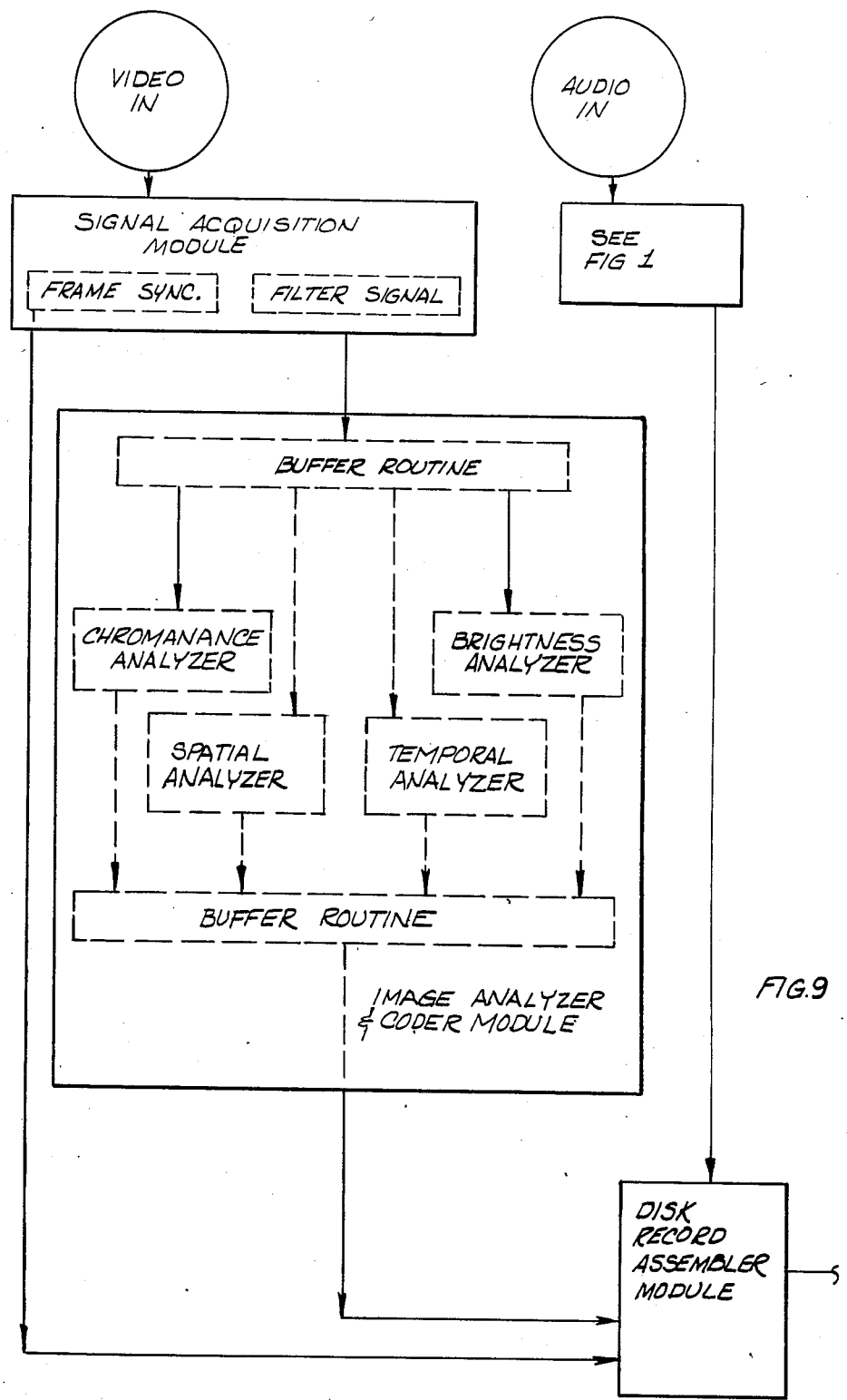
FIGS. 9 and 9a together are a schematic diagram of the software modules for the digital audio and video recording and playback system of the present invention.
Figure 9A:
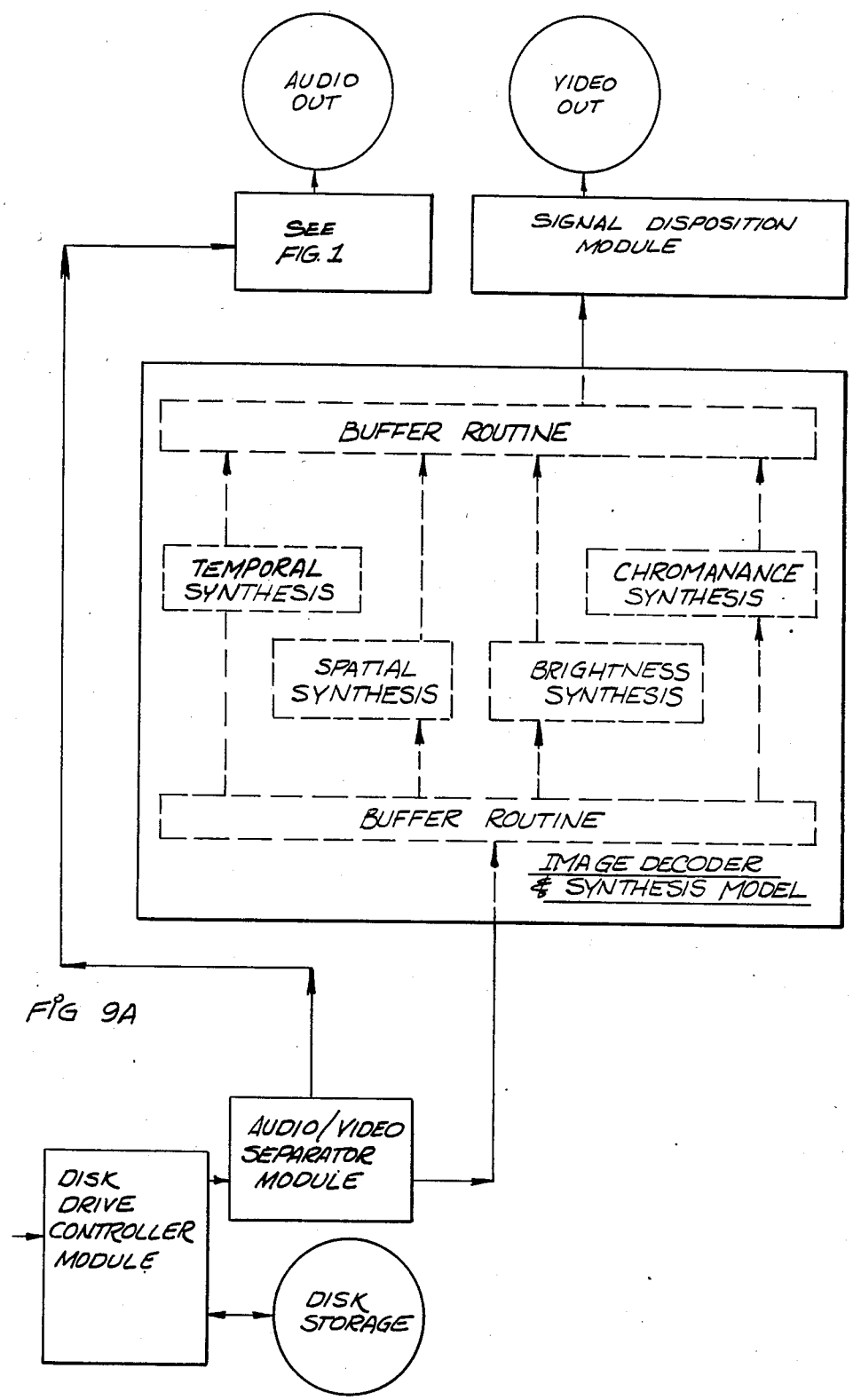

Goods G are arrayed on shelves in the location to be inventoried. Shelves also should incorporate bar codes B on at least one end of each shelf space. The goods should be stacked, if more than one deep, from the back of the shelves, leaving partially filled columns exposed for easy detection by device 10. The bar codes are commodity codes or other item specific designations describing the goods arrayed on the bar coded shelf. Alternatively, a key pad could be used to manually enter this information, before scanning each shelf with device 10. In operation, the portable microcomputer is initialized, and the disc record assembler module and other control codes are entered. The operator would stand in front of the goods G on shelves and if necessary, key in the goods description (commodity code, stock number, etc.). Where a bar code reader is incorporated in device 10, this step is not necessary. Device 10 is aimed at the shelved goods and is scanned along the full width of the shelf. A typical example of the resulting analog signal is shown in FIG. 7. This signal corresponds to the depth of space along the goods loaded shelf as a function of time as determined by the rangefinder echo. The time period in this case corresponding to the time between detection of the bar codes on the shelf uprights (where applicable) or the shelf uprights themselves.

This analog contains frequency, amplitude and wave form characteristics which are manipulated, modified, and condensed to form the digital disc record as set forth supra. This digital record can later be sent via conventional modem to a central inventory control location for later display in graphic or tabular form.

An example of a non-acoustic output of the data compresser and recorder of the present invention would be its application to seismagraphic data recording, compression, and analysis. The output in this instance would be a "groomed" graph with features over a specified size and minus noise or reverberations beyond a specified order of harmonics.

Also, any sensor that outputs an analog waveform type of signal can use the instant invention as a data compressor and recorder. Examples of these sensors would include pressure transducers, flow meters, photodiodes, microwave receivers (radar and radio frequency), photocells, piezo electric devices, charge-coupled devices, and scintillation counters. Likewise, digital data that is representative of waveform data can be compressed, according to this invention, by first converting the digital data into analog signals which can then be processed by the system described herein according to the methods disclosed.

In the system described, the process methodology for sampling, analyzing, coding and recording, and then decoding and playback, enables the system to achieve up to three hundred times the storage density of previous systems.

The digital recording and playback system of the present invention for both audio and video recording and playback utilizes a data storage medium as previously described such as flexible or rigid magnetic disks, magneto-optical disks or optical disks. As previously described, storage media such as flexible and rigid magnetic disks, magneto-optical disks, and optical disks are several orders of magnitude less expensive presently than solid state silicon chip memory devices or magnetic bubble memory. It is highly desirable commercially for an efficient digital recording and playback system to be economically competitive to the combination of conventional analog and digital memory presently used in image recording, storage, and playback systems. The preferred embodiment of the present invention utilizes a 5¼" flexible diskette commonly known as a mini-floppy.

In using such storage devices, it is essential that there be an extremely high density of stored data on the medium. When a magnetic medium is employed, such as a rigid or flexible magnetic disk, the number of bits per square inch can be increased to a useful level by increasing the number of tracks per inch, as shown in U.S. patent application Ser. No. 609,765 filed May 14, 1984 by the inventor.

In the application of the present invention to video digital recording and playback, the preferred format for a floppy disk is at least 640 tracks. The entire memory space can then be accessible within ½ second or less to allow continuous motion playback that includes jump-cut splices anywhere in the recorded material. In the preferred embodiment of the present invention, audio and the video record and playback disk (FIG. 13) has a worst case access time of about 0.5 second. To facilitate recovery and manipulation of any segment of audio and video, the data is recorded in a controlled format of sectors dedicated to directories, soundfiles, imagefiles, and edit lists. As described herein, the formating of data to the system is accomplished as described herein and in a paper entitled "Digital Audio Recording on Floppy Disk" by the inventor, presented at the 78th Audio Engineering Society convention in Anaheim, Calif. in May, 1985.

Lastly, the digital signal processing for the audio and video information must be done in a manner that reduces the number of bits being stored while retaining sufficient information to produce the audio and video quality.

Reduction in the bit rate of digital audio data for high fidelity recording and playback is accomplished in the same manner as previously described. Implementations have been demonstrated with bit rates of 56,000 to 400,000 bits per second per channel. Many video bit rate reduction schemes have been proposed and utilized. Compression Labs of Salt Lake City, Utah, Widcom, Inc., of Campbell, Calif., and Pictel of Lynn, Mass. have demonstrated rates of 56,000 to 8,000,000 bits per second. The preferred embodiment of the present invention allows 200,000 bps for the audio and 200,000 bps for the video.

The video data processing module of the present invention requires the following major functional sections:
(1) Signal conditioning
(2) Analog to digital and digital to analog conversion
(3) Frame buffers (temporary image storage during processing)
(4) Image analysis and synthesis and image coding and decoding,
including software for:
Chromanance filtering
Adjacent pixel redundancy elimination in luminance and amplitude
Time domain redundancy elimination with frame skipping and conditional replenishment of portions of frames The audio data analysis synthesis module has been previously disclosed.

Referring to the drawings, the analog video signal and the analog audio signal are input to the recorder separately. Both signals are processed independently of one another until the Disk Record Assembler Module (DRAM) where the coded audio and video data are synchronized and written onto the floppy disk in separate data blocks. Therefore, the audio and video processing modules may be considered asynchronous, but constrained to operate in real time with the maximum phase shift between the two signals determined by the size and speed of the temporary buffer memories utilized by the DRAM. Typically, the video and audio signals are not out of phase by more than 0.5 second prior to resynchronization in the output RAM buffer.

Since the audio processing module has been described fully hereinbefore, the balance of this disclosure will concentrate on the video and the changes to the DRAM with respect to the audio patent referenced herein.

After the video signal has been conditioned with analog filtering, amplification and attenuation as required, etc., it is digitized by conventional analog to digital converters at a frame rate of 30 images per second. Each image has a resolution of 576 by 480 pixels with eight bits (one byte) of data for each pixel. The frame rate, resolution, and pixel data may vary depending on the application and cost/benefit factors. The image to be processed is stored in a temporary buffer memory.

The buffer memory is a four megabyte first in first out digital memory (FIFO). The size may vary depending on the application and cost/benefit factors. Each frame image is passed through the buffer as it is sequentially processed.

Each frame image is processed to reduce the number of bits to the minimum required for synthesis of an output video signal that closely resembles the input signal. The amount of processing, and the actual number of bits required to encode the data will depend on the application of the system and cost/benefit factors. Typically, the 2,200,840 bits in the original digitized frame is represented by an encoded frame image containing about 8,000 bits on average. This is stated as an average due to the subject dependant nature of the processing algorithms.

The Image Analysis/Synthesis Coder/Decoder (IAC) logic is based on a three dimensional, thirteen factor analysis of each pixel in the frame image. The three dimensions are color spectrum, spatial relationships, and time. The thirteen factors are the eight adjacencies to the pixel in its two dimensional plane, red, green and blue chrominance factors, time and brightness (power). The literature in image processing provides the general expressions of the relationships among these factors.

The hereinafter described mathematical analyses are utilized in the practice of the present invention with the data for each factor being compared against libraries for each factor in the manner hereinbefore described.

For example, image variables such as luminance, or tri-stimulus values within image amplitude features can be applied to provide a shape for first order image histograms described by values for "mean", "variance", "skewness", "Kurtosis", "energy" and "Entropy". Other, second order histograms can be described by the values for "auto-correlation", "covariance", and "inertia". These relationships are described fully in the following publications:

RATLIFF, P.A., Bit-rate reduction for high-quality digital television transmission. International Broadcasting Convention 78, IEE Conference Publication No. 166, September, 1978.

JONES, A. H., Digital sound and television sampling-rate changing. EBU Review 163, Technical, pp. 127-136, June, 1977.

WESTON, M., A PAL/YUV digital system for 625-line international connections. EBU Review 163, Technical, pp. 137-148, June 1977.

DEVEREUX, V. G., STOTT, J. H., Digital video: sub-Nyquist sampling of PAL colour signals. Proc. IEE, 125, (9), pp. 779-786, September 1978.

NYQUIST, H., Certain topics in telegraph transmission theory. Trans. Amer. Inst. Elect. Engrs., 47, pp. 617-644, February 1928.

ROSSI, J. P., Sub-Nyquist encoded PCM NTSC colour television. J. SMPTE, 85, (1), pp. 1-6, January 1976.

DEVEREUX, V. G., Differential coding of PAL video signals using intra-field prediction. Proc. IEE, 124, (12), pp. 1139-1147, December 1977.

CONNOR, DENIS, Digital television at reduced bit rates. 10th SMPTE Conference, Detroit, Mich., 24 January 1976, pp. 44-47.

PELED, ABRAHAM, Digital signal processing. 1976.

CAPPELLINI, VITO. Digital filters and their applications. Academic Press, Inc., Ltd., 78, pp. 287-300.

Digital processing of signals. McGraw-Hill, Inc., pp. 253-257, 1969.

SCHWARTZ, MISCHA, Signal processing, pp. 337-365, 1975.

HUNT, B. R. Digital image processing. University of Arizona, Tucson. Applications of Digital Signal Processing. 1978. pp. 169-237.

PRATT, WILLIAM K., Digital Image Processing. John Wiley & Sons, 1978. pp. 69; 471-477; 602-603; 636-637; 645; 650-659; 685; 690-691.

GONZALEZ, RAFAEL C., Digital Image Processing. Addison-Wesley Publishing Co., Inc., 1977. pp. 80; 102-114; 166-169; 238; 300.

Software or firmware derived as described in the hereinbefore identified publications for processing temporal, spatial, brightness, and chromance signals utilizing the same principles for encoding and decoding as previously described for spectrograms and histograms to reduce the data needing to be stored and from which each of these factors can be reconstructed, essentially in real time. The encoded frame image data is passed from the buffer to the DRAM where it is temporally aligned with the corresponding encoded audio data. Once aligned, the audio and video data blocks are assigned disk memory locations, and the appropriate decoding directory and waveform table vectors are assigned disk storage space as well. The encoded and organized data and parametric information is then written on the disk.

On playback, the audio and video data blocks are separated by the DRAM and sent to their respective processing buffer memories. The audio synthesis system has been previously disclosed. The video data is synthesized by the inverse of the operations used for encoding. The multi-dimensional reconstruction of a digital data set similar to the original data is accomplished in real time. The synthesized data set is then converted from digital to analog form, conditioned, and outputted as an analog video signal for viewing on a television, or monitor with composite or RGB input capability. The signal may also be output in digital form for viewing on a digital raster display device such as a CRT, plasma, LCD, or LED device. The encoding and decoding functionalities of the system are more fully described hereinafter with reference to the Figures.

Figure 15:
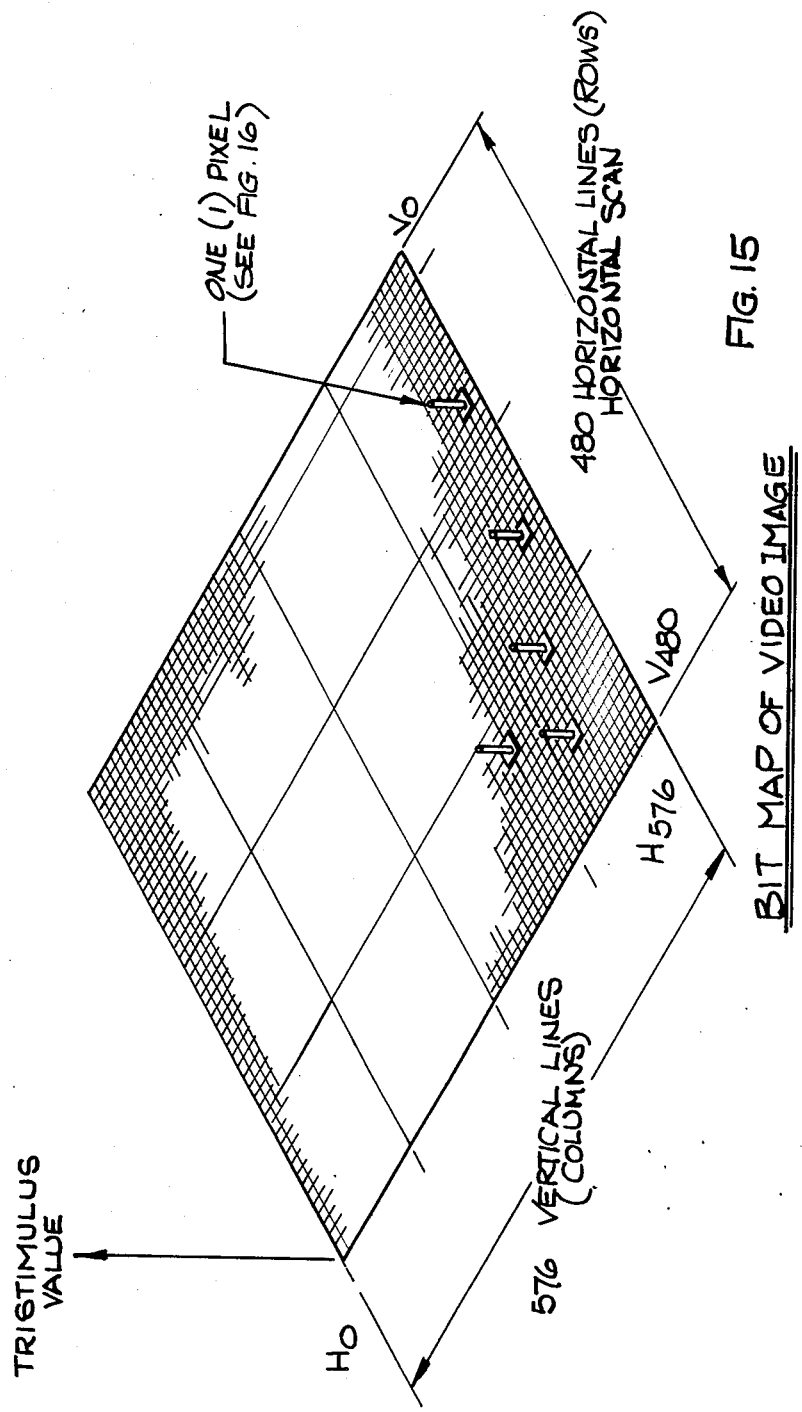
FIG. 15 is a diagrammatic representation of the bit map of a digital video frame image.
Figure 16:
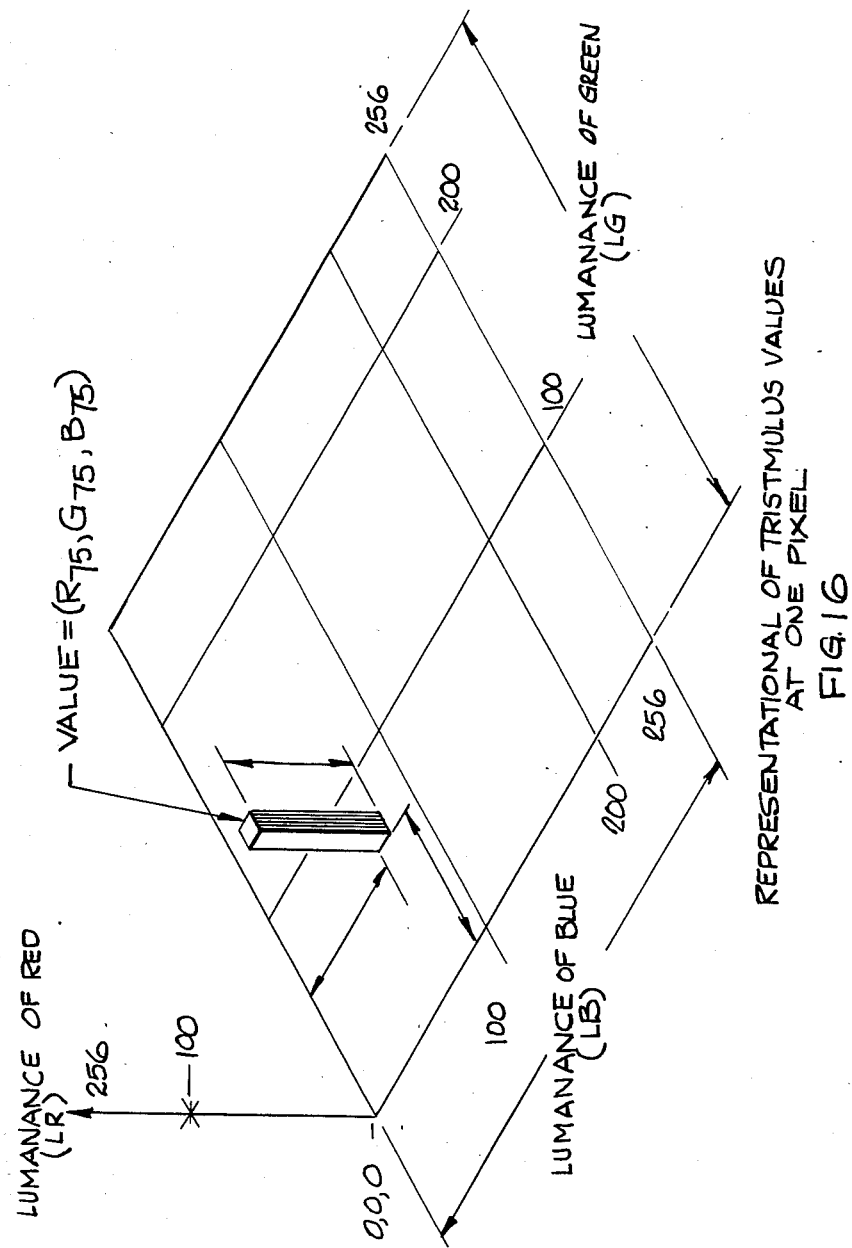
FIG. 16 is a diagrammatic representation of the encoding of tri-stimulus values of a single picture element (pixel).

The tristimulus values of the image contain its color information. A bit map of the image is shown in FIG. 15. One pixel and its tristimulus values are shown in FIG. 16. The tristimulus values of the image may be considered for analysis purposes to be spatially and temporally distributed. The absolute change in tristimulus values at each pixel or sub-image group of pixels caused by motion of the subject from frame to frame, yield spatial changes in the image coloration. Change in color of a fixed non-moving subject yields time domain (temporal) shifts in tristimulus data. Both effects may be combined.

Encoding of the changes in these values for each pixel and data compression is achieved by frame to frame comparison of the tristimulus values either directly operating on them, or by operating on their mathematically transformed representations. The frame to frame difference signals may be stored as a reduced data set, or the vector information required to calculate and the transform coefficients may be stored, or the coefficients themselves may be stored depending on which output is process-efficient for the video frame data under analysis.

FIG. 11 illustrates the next video frame in the sequence beginning with FIG. 10. The data plot has changed slightly due to the varying subject or content of the video frame. Note that very little has changed in this frame to frame example. In some cases the change will be much greater, but rarely 100% different on all axes.

FIG. 12 is a 3-D representation of only the differences between FIGS. 10 and 11. From this illustration, it is apparent that only a small fraction of the information contained in FIG. 11 must be encoded for storage. In this example, the encoding is of the difference signal in its transformed state, a series of coefficients. Decoding and synthesis of an image based on the stored difference signal requires the calculation of the inverse mathematical transformation used for analysis operating with the stored coefficients.

Figure 14:
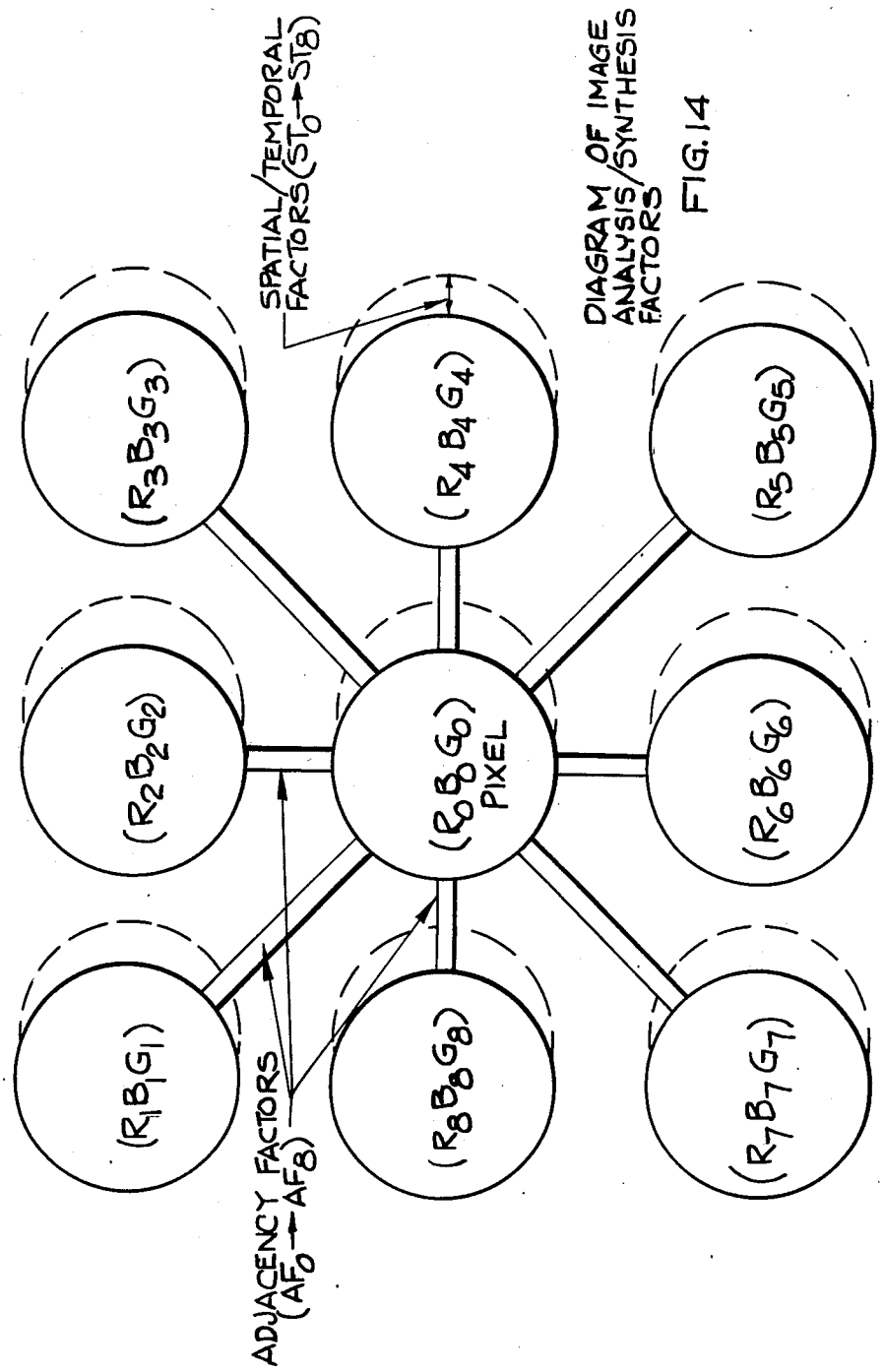
FIG. 14 is a diagrammatic representation of the analysis and synthesis factors related to a single digital video image picture element (pixel).

FIG. 14 is a diagram of the principal analysis/synthesis factors. Data reduction may be achieved by any combination of one or more encoding processes operating on these factors. The transformation difference signal described in the preceding example reveals, and permits the encoding of, the spatial/temporal information as well as the chrominance (RGB) factors.

By similar means, the distribution of brightness in the video frame and pixel groupings by adjacency may be stored in frame to frame differential encoding to reduce bit rate.

In many cases, video frames are identical, or indistinguishably different from one another. This may occur in sequential frames or in non-sequential frames. In either case data reduction may be achieved by storing only the address of the frame data to be repeated. The DRAM stores such incidences in image vector tables residing in the library of video reference data in the storage medium such as the disk. Off-line, or non-real time post processing of the real time digital video recording will yield additional data reduction due to this type of redundancy encoding. In this context, real time means in the same time interval even though displaced in time from the actual time interval.

Figure 13:
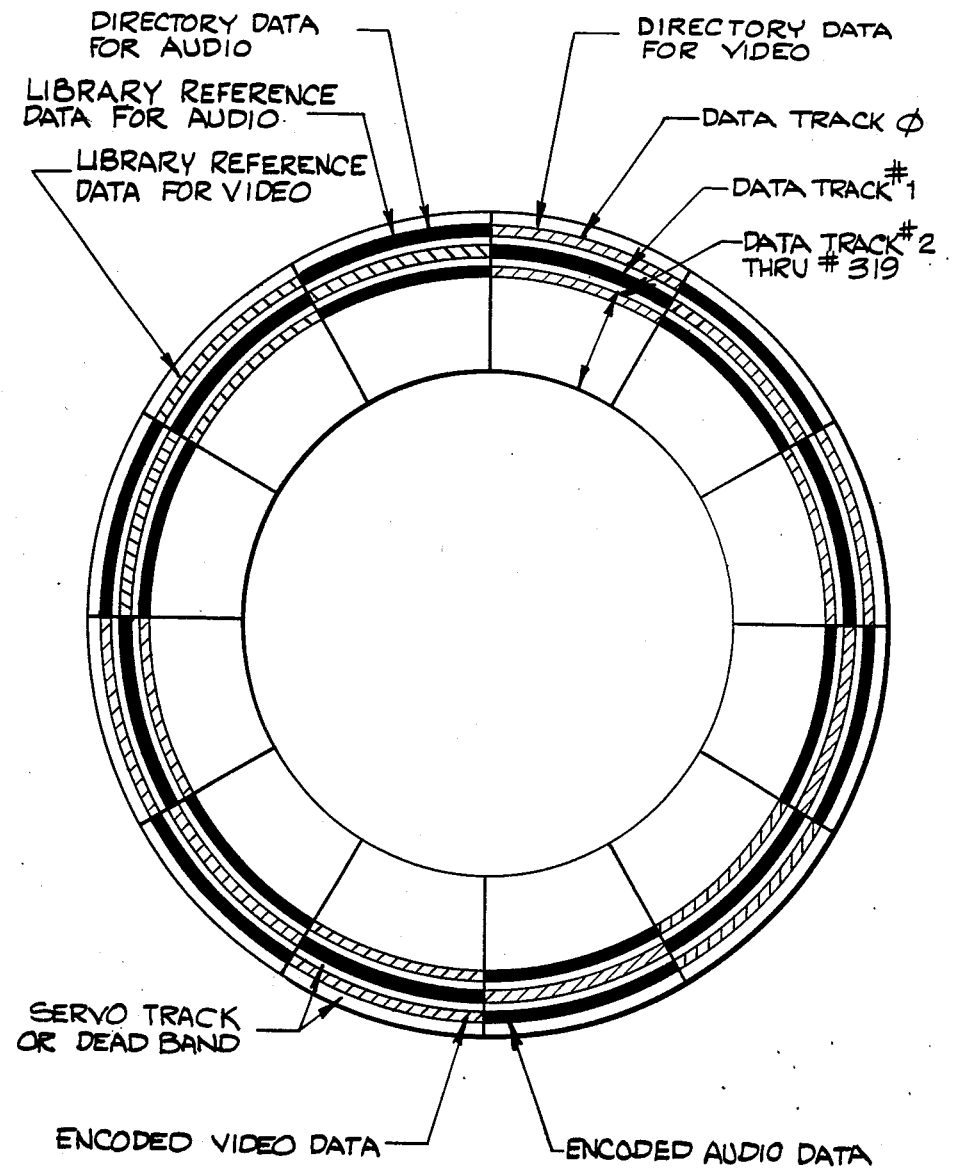
FIG. 13 is a diagrammatic representation of the audio and video data disposition on a 5¼" flexible magnetic diskette.

FIG. 13 is a diagram of the disposition of the encoded audio and video data as stored on a floppy disk. Data Track Ø stores the directory information for audio and video in separate sectors. The directories contain the maps or sets of digital addresses that are used by the DRAM to organize the encoded audio and video data that resides in tracks 2 through 639 (or more). The directories also contain the catalogs for the library reference data for audio and video decoding. These libraries contain waveform tables, histograms, image address vectors, and frequency spectrograms and other reference information that may be required to synthesize audio and video data streams for playback.

There are two steps in the processing of each of the digital data streams in the Image Analysis Coder/Decoder Module. The first step is the mathematical transformation of the digital signal data into an appropriate frame of reference for effective analysis. The second step is the comparative analysis of the significant factors revealed in the transform space depiction of the data and reduction of the number of bits needed to represent the data. FIG. 10 illustrates the 3-D plot of a signal that has been transformed (by mathematical means such as the Hadamard, Fourier or Hotel transforms) into an analysis space consisting of amplitude, time and frequency dimensions. The time frame is preferably about 1/30 of a second, or 1 video frame. The amplitude is then normalized to a range of 0 to 1.0 dimensionless units. Frequency is allocated into 64 bands or "bins" that span the energy spectrum of the image. The exact range of this bandwidth will vary with the type of video system, and its optical or electromagnetic characteristics. The frequency range of a system intended for infrared night vision will differ substantially from a medical X-ray imaging device.

Playback of the encoded video digital signal is accomplished in multiple steps. Some of these steps can either occur sequentially, or in parallel. Some embodiments of the system may operate exclusively one way or the other if desired for economic and functional reasons. The present, preferred embodiment of the playback system operates as follows:

(1) A single sequential stream of digital data is read from the disk or other storage device by the disk drive controller module, or equivalent reading apparatus. The resultant data stream as previously described, will contain many different types of encoded video data, i.e. the decoding parameters necessary to later expand or synthesize a video signal, and the frame synchronization timecode markers. The data stream from the disk drive controller module, in the embodiment illustrated is preferably passed to the Audio/Video Separator Module. If a different audio recoding and reproduction system is employed, separation can be maintained and subsequently synchronized.

(2) The Audio/Video Separator Module seeks out and removes the data blocks flagged as audio data and decoding parameters (waveform tables, histograms, and the like). This audio synthesis information along with a copy of the synchronization timecode markers is passed to the audio decoding subsystem previously disclosed. The remaining information, which is entirely video, and a copy of the timecode markers is passed to the Image Decoder and Synthesis Module.

(3) The Image Decoder and Synthesis Module contains data buffer and data processing routines. The data buffer software allocates and manages the portions of system memory used to temporarily store video frame data while it is being processed. These memory segments are typically blocks of RAM that may be configured as bit maps of video frame data, FIFO (First In-First Out), or LIFO (Last In-First Out) storage buffer memories for temporary storage of other forms of the encoded video data.

The data processing routines include software or firmware for reconstruction of the video signal from the stored data. The software modules typically will be separately processing the factors of Chrominance, Brightness, Spatial and Temporal factors for Synthesis. In some applications, these routines may themselves be modified by substitution within them of subroutines stored in the disk memory. The software operates on the encoded video data presented by the A/V Separator Module.

The encoded video data consists of strings of binary numbers that represent the decoding instructions to the software modules (parameters), the data to be processed by those instructions, and timecode markers to allow synchronization of the synthesized video frames and synthesized audio during combined playback. Without the timecode markers it becomes highly probable that the audio and video signals will not be in phase. The resulting lack of "lip sync" in videos of talking or singing people is a qualitatively unacceptable artifact in some previous art.

In the Image Decoder and Synthesizer Module (IDSM) the encoded video data is assigned for processing to the appropriate decoding subsystem. For example, within the block of data passed to the IDSM, there may be up to four different catagories (data streams) of parameters and data. Parameters and data for chrominance are passed to the Chromanance decoder/synthesizer. Parameters and data for brightness are passed to the Brightness decoder/synthesizer. Parameters and data for spatial factors are passed to the Spatial decoder/synthesizer. Parameters and data for temporal factors are passed to the Temporal decoder/synthesizer. All four streams of data may not be required for reconstruction of a particular frame of video. Typically, only the minimum set of decoders/synthesizers are utilized for any given video frame. Also, the decoding/synthesizing may take place in parallel, with each process occurring simultaneously in each decoder/synthesizer utilizing the same data and different decoding parameters, or sequentially with partial results passed from decoder/synthesizer to decoder/synthesizer, again starting from one data set and multiple parameter sets.

In operation, the decoding and synthesis of a video frame operates in the following manner.

(1) The disk drive controller receives a request from the CPU via the DMA device to retrieve the next video frame.

(2) The disk drive controller module locates the audio and video directories on the disk and reads them to find the next set of addresses of data sectors on the disk (see FIG. 13).

(3) Stored data for the video and audio of the video frame, including the decoding parameters, which includes library information as required, timecode, and the encoded video frame data is transferred to the A/V Separator Module.

(4) The audio data, timecode, and parameters are stripped out and the video portions sent to the IDSM.

(5) The IDSM receives the following sets of data and places them in memory buffers:
  (a) a pixel subgrouping bit map; this is a 2-D memory structure (depicted in FIG. 15) that identifies portions of the frame for infill by the decoder/synthesis software operating with tristimulus and spatial/temporal data and parameters;
  (b) tristimulus decoding parameters with data;
  (c) Hotel transform coefficients and data for spatial/temporal synthesis;
  (d) waveform data with its relevant frequency spectrogram; and
  (e) timecode markers for the beginning and end points of the reconstructed video frame.

(6) The IDSM computes the inverse Hotel transform, the tristimulus values, a background texture (from the waveform/spectrogram), infills the bitmap with the synthesized digital video image, and sets the beginning and endpoints of the video frame to correspond to the required frame length (30 frames per second video, or 24 frames per second film). Note that spatial and temporal information are reconstructed from one mathematical transform. Two may be required in other cases. Also, the tristimulus data contains luminance information so that separate processing for brightness can be unnecessary. If this description had been for a monochrome image, the chromanance synthesis would have been omitted, and a set of brightness parameters and data would have been necessary to reconstruct the image.

(7) The reconstructed digital video image of one frame is passed to the Signal Disposition Module where it is converted to analog form, conditioned, and is output in synchronization with the audio signal from the audio decoder previously disclosed.

It is contemplated that the inventive concepts herein described may be variously otherwise embodied and it is intended that the appended claims be construed to include alternative embodiments of the invention except insofar as limited by the prior art.

What is claimed is:

1. A microcomputer recording system for recording analog audio and video signals in digital data form comprising:

converting means for converting an analog audio signal into a multiplicity of digital data streams wherein at least one of said data streams is a relatively broadband reference signal representative of the amplitude of a preselected range of audio frequencies, and wherein another of said data streams is produced by filtering the analog audio signal to produce a data stream channel indicative of a plurality of discrete frequencies encompassed by the bandwidth represented by the first data stream; and wherein another of said digital data stream is a reference signal representative of the amplitude of the audio signal for each of plurality of discrete frequencies;

sampling means for producing a sequential stream of samples in each of said digital data streams, selection means for selecting a predetermined portion of the digital data samples produced by said sampling means in each digital data stream;

means for separately storing each of said selected data samples produced by said sampling means;

means for comparing the reference data stream containing amplitude data with the reference data stream containing frequency data to produce frequency spectrogram data representative of the frequency and energy of the original audio signal;

means for comparing said histogram data with selected waveform parameters and producing addressable data representative of the waveform of the original input data;

means for sequentially assembling and storing the frequency spectrogram data and the amplitude reference data and the addressable waveform data for subsequent use; and converting means for converting an analog video signal into a multiplicity of digital data streams wherein the first of said digital data streams is a sequential time code representative of the beginning of each video frame, and wherein another of said digital data streams is produced by filtering the analog time domain signal to produce a data stream channel indicative of chrominance; and wherein another of said data streams is indicative of brightness; and wherein another of said digital data streams is indicative of pixel spatial relationships; and wherein another of said data streams is indicative of the temporal frame to frame relationships; and coding means for receiving each data stream individually, said coding means including means for mathematically transforming each digital data stream into modified data streams each capable of being subsequently analyzed by comparison of the chrominance, brightness and spatial factors present respectfully in said modified data streams, and means for selecting predetermined data bits from each of said modified data streams after comparison, in a sufficient amount to reconstruct each chrominance, brightness and spatial factors for video presentation, and means for storing said digital data bits for retrieval.

2. A digital recording and playback system capable of recording and playing back analog audio and video analog signals from signals stored in digital form either separately or together comprising:

converting means for converting an analog audio signal into a multiplicity of digital data streams wherein at least one of said data streams is a relatively broadband reference signal representative of the amplitude of a preselected range of audio frequencies, and wherein another of said data streams is produced by filtering the analog audio signal to produce a data stream channel indicative of a plurality of discrete frequencies encompassed by the bandwidth represented by the first data stream; and wherein another of said digital data stream is a reference signal representative of the amplitude of the audio signal for each of plurality of discrete frequencies;

sampling means for producing a sequential stream of samples in each of said digital data streams, selection means for selecting a predetermined portion of the digital data samples produced by said sampling means in each digital data stream;

means for separately storing each of said selected data samples produced by said sampling means;

means for comparing the reference data stream containing amplitude data with the reference data stream containing frequency data to produce frequency spectrogram data representative of the frequency and energy of the original audio signal;

means for comparing said histogram data with selected waveform parameters and producing addressable data representative of the waveform of the original input data;

means for sequentially assembling and storing the frequency spectrogram data and the amplitude reference data and the addressable waveform data for subsequent use; and converting means for converting an analog video signal into a multiplicity of digital data streams wherein the first of said digital data streams is a sequential time code representative of the beginning of each video frame, and wherein another of said digital data streams is produced by filtering the analog time domain signal to produce a data stream channel indicative of chrominance; and wherein another of said data streams is indicative of brightness; and wherein another of said digital data streams·is indicative of pixel spatial relationships; and wherein another of said data streams is indicative of the temporal frame to frame relationships; and coding means for receiving each data stream individually, said coding means including means for mathematically transforming each digital data stream into modified data streams each capable of being subsequently analyzed by comparison of the chrominance, brightness, pixel spatial relationships and temporal factors present respectfully in said modified data streams, and means for selecting predetermined data bits from each of said modified data streams after comparison, in a sufficient amount to reconstruct each chrominance, brightness, pixel spatial relationships and temporal factors for video presentation, and means for storing said data bits for retrieval; and means for decoding and synthesizing the chrominance, brightness, pixel spatial relationships and temporal factors suitable for video presentation; and means for converting the digital data to analog form.

3. An apparatus for recording incoming analog video signals in a compressed digital form comprising:

means for providing an analog signal representative of an incoming signal;

means for digitizing said analog signal to produce a digital signal; and means for tranforming said analog signal into a plurality of discrete digital data streams; and means for sampling said digitized data streams; and means for analyzing said digitized data streams;

buffer means for storing said digitized data streams;

analysis means for extracting individual functional characteristics from said plurality of data streams;

means for comparing said functional characteristics within said digital data streams;

means for storing truncated portions of said data streams after comparison;

means for recording said truncated data streams in a manner to enable reproduction of a facimile of the original stream.

* * * * *